United States Patent [19]
Itoh et al.

[11] Patent Number: 6,113,513
[45] Date of Patent: Sep. 5, 2000

[54] TOROIDAL TYPE CONTINUOUSLY VARIABLE TRANSMISSION

[75] Inventors: Hiroyuki Itoh; Hisashi Machida; Ryota Iwahashi, all of Fujisawa, Japan

[73] Assignee: NSK Ltd., Tokyo, Japan

[21] Appl. No.: 09/017,684

[22] Filed: Feb. 3, 1998

[30] Foreign Application Priority Data

Feb. 26, 1997 [JP] Japan .................................. 9-042310
Aug. 26, 1997 [JP] Japan .................................. 9-228733
Sep. 8, 1997 [JP] Japan .................................. 9-242454

[51] Int. Cl.$^7$ .................................................. F16H 15/38
[52] U.S. Cl. ............................................. 476/10; 476/40
[58] Field of Search .................................. 476/9, 10, 40, 476/41

[56] References Cited

U.S. PATENT DOCUMENTS

| | | | |
|---|---|---|---|
| 3,163,050 | 12/1964 | Kraus | 476/10 |
| 3,280,646 | 10/1966 | Lemieux | 476/9 |
| 4,272,999 | 6/1981 | Perry | 476/10 |
| 4,570,501 | 2/1986 | Perry | 476/10 |
| 4,955,246 | 9/1990 | Nakano | 476/10 |
| 5,007,298 | 4/1991 | Machida . | |
| 5,584,778 | 12/1996 | Machida et al. . | |

FOREIGN PATENT DOCUMENTS 62-184251  11/1987  Japan .

*Primary Examiner*—David A. Bucci
*Assistant Examiner*—William C. Joyce
*Attorney, Agent, or Firm*—Sughrue, Mion, Zinn, Macpeak & Seas, PLLC

[57] ABSTRACT

A toroidal type continuously variable transmission improves transmission efficiency. The thrust loads applied to first and second ball-and-roller bearings as a pressing device is actuated are reduced, and the rotational torques of these two ball-and-roller bearings are decreased so as to achieve higher transmission efficiency. When the pressing device is actuated, the inner rings of the first and second ball-and-roller bearings are subjected to thrust loads which act on them to move them toward each other. The thrust loads are reduced by pushing the inner rings in such directions as to move them away from each other by first and second pistons constituting first and second hydraulic cylinders, respectively. Further, a hydraulic force generator is provided between the output bearing and the input bearing; it produces a hydraulic force acting in the opposite direction from that of the reaction force applied to the outer rings of an output bearing and an input bearing, respectively, so as to reduce the thrust loads on the output bearing and the input bearing. A high-pressure oil employed in the hydraulic circuit for speed change control is introduced to the hydraulic force generator.

32 Claims, 15 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission and, for example, to a single-cavity, toroidal type continuously variable transmission used as an automotive transmission.

2. Description of Related Art

Research is being conducted on using a toroidal type continuously variable transmission schematically shown in FIGS. 1 and 2 as an automotive transmission. This toroidal type continuously variable transmission has an input disc 2, namely a first disc, concentrically supported with an input shaft 1, and an output disc 4, namely a second disc, fixed on an end of an output shaft 3 concentrically disposed with the input shaft 1 as disclosed, for example, in Japanese Utility Model Application Laid-open No. 62-71465. Provided inside a casing which houses the toroidal type continuously variable transmission are trunnions 6, 6 which rock about pivots 5, 5 torsionally positioned in relation to the input shaft 1 and the output shaft 3.

The trunnions 6, 6 are respectively provided with the pivots 5, 5 on the outer surfaces at both ends thereof. At the centers of the trunnions 6, 6, the proximal ends of displacement shafts 7, 7 are supported, and the tilt angle of the displacement shafts 7, 7 can be adjusted by rocking the trunnions 6, 6 about the pivots 5, 5. Power rollers 8, 8 are rotatably supported around the displacement shafts 7, 7 supported by the trunnions 6, 6, the power rollers 8, 8 being held between the input disc 2 and the output disc 4.

The sections of inner surfaces 2a and 4a of the input disc 2 and the output disc 4, respectively, which are opposed to each other, are shaped like recessed surfaces obtained by turning arcs, which have the pivots 5 as the centers thereof, about the input shaft 1 and the output shaft 3. The peripheral surfaces 8a, 8a of the power rollers 8, 8 formed into spherical convex surfaces are held against the inner surfaces 2a and 4a.

A loading-cam type pressuring device 101 is provided between the input shaft 1 and the input disc 2; the pressuring device 101 resiliently presses the input disc 2 toward the output disc 4. The pressuring device 101 is constructed by a cam disc 102 which rotates together with the input shaft 1, and a plurality of (e.g. four) rollers 12, 12 held by a retainer 11. Formed on one surface of the cam disc 102, namely the left surface in FIGS. 1 and 2, is a cam surface 13 which is an irregular surface formed in the circumferential direction; a similar cam surface 14 is formed also on the outer surface of the input disc 2, namely the right surface in FIGS. 1 and 2. The plurality of rollers 12, 12 are rotatably supported about a radial axis in relation to the center of the input shaft 1.

At operating the toroidal type continuously variable transmission constructed as set forth above, when the cam disc 102 rotates as the input shaft 1 rotates, a cam surface 13 presses the plurality of rollers 12, 12 against a cam surface 14, which is an outer surface of the input disc 2. This causes the input disc 2 to be pressed against the power rollers 8, 8 and rotated due to the pair of the cam surfaces 13 and 14 pressing against the plurality of rollers 12, 12. The rotation of the input disc 2 is transmitted to the output disc 4 via the power rollers 8, 8, causing the output disc 4 to rotate the output shaft 3 secured to the output disc 4.

When changing the rotational speed ratio (speed change ratio) of the input shaft 1 to the output shaft 3, in order to reduce the speed between the input shaft 1 and the output shaft 3, the trunnions 6, 6 are rocked about the pivots 5, 5 to tilt the displacement shafts 7, 7 so that the peripheral surfaces 8a, 8a of the power rollers 8, 8 respectively come in contact with a closer-to-the-center portion of the inner surface 2a of the input disc 2 and a closer-to-the-outer-periphery portion of the inner surface 4a of the output disc 4 as shown in FIG. 1.

To increase the speed, the trunnions 6, 6 are rocked about the pivots 5, 5 to tilt the displacement shafts 7, 7 so that the peripheral surfaces 8a, 8a of the power rollers 8, 8 respectively come in contact with a closer-to-the-outer-periphery portion of the inner surface 2a of the input disc 2 and a closer-to-the-center portion of the inner surface 4a of the output disc 4 as shown in FIG. 2. Setting the tilt angles of the displacement shafts 7, 7 at the midpoints illustrated in FIGS. 1 and 2, respectively, enables an intermediate speed change ratio to be obtained between the input shaft 1 and the output shaft 3.

FIGS. 3 and 4 illustrate a toroidal type continuously variable transmission which has been disclosed in the microfilm of Japanese Utility Model Application Laid-open No. 1-173552 and which has been further embodied. The input disc 2 and the output disc 4 are rotatably supported around an input shaft 15, which is a rotating shaft shaped like a circular pipe, via needle bearings 16, 16, respectively. The cam disc 102 is spline-engaged on the outer peripheral surface of the left end of the input shaft 15 shown in FIG. 3. A jaw 17 prevents the cam disc 102 from moving away from the input disc 2. In the loading-cam type pressuring device 101, the cam disc 102 and the rollers 12, 12 press the input disc 2 toward the output disc 4 as the input shaft 15 rotates so as to rotate it. An output gear 18 is joined to the output disc 4 through keys 19, 19 so that the output disc 4 and the output gear 18 rotate in synchronization.

The pivots 5, 5 provided on both ends of a pair of the trunnions 6, 6 are supported by a pair of support plates 20, 20 such that they are free to be displaced in the rocking direction and the axial direction, i.e. in the front-back longitudinal direction in FIG. 3 and the left-right lateral direction in FIG. 4, respectively. The displacement shafts 7, 7 are supported in round holes 23, 23, respectively, which are formed at the midpoints of the trunnions 6, 6. The displacement shafts 7, 7 respectively have support shafts 21, 21 and pivot shafts 22, 22 which are parallel to each other and eccentric. The support shafts 21, 21 are rotatably supported in the round holes 23, 23 via radial needle bearings 24, 24. The power rollers 8, 8 are rotatably supported around the pivot shafts 22, 22 via radial ball-and-roller bearings such as radial needle bearings 25, 25.

The pair of displacement shafts 7, 7 are provided such that they are 180 degrees opposite from each other about the input shaft 15. The pivot shafts 22, 22 of the displacement shafts 7, 7 are decentered from the support shafts 21, 21 in the same direction with respect to the rotational direction of the input disc 2 and the output disc 4, i.e. in the opposite lateral direction in FIG. 4; the eccentric direction is nearly orthogonal to the direction in which the input shaft 15 is disposed (in the lateral direction in FIG. 3 or in the longitudinal direction in FIG. 4). Hence, the power rollers 8, 8 are supported so that they are slightly free to shift in the direction in which the input shaft 15 is oriented. As a result, even if the power rollers 8, 8 have come to be apt to shift in the axial direction of the input shaft 15 (in the lateral direction in FIG. 3 or in the longitudinal direction in FIG. 4)

due to the dimensional errors of the component parts, the elastic deformation taking place when power is transmitted, or for other reason, such a shift can be absorbed without causing an undue force to be applied to the component parts.

Provided between the outer surfaces of the power rollers 8, 8 and the middle inner surfaces of the trunnions 6, 6 are thrust ball-and-roller bearings such as thrust ball bearings 26, 26, and thrust bearings such as thrust needle bearings 27, 27 which support the thrust load applied to outer rings 30, 30 which will be discussed below in the order in which they are listed from the outer surfaces of the power rollers 8, 8. The thrust ball bearings 26, 26 allow the power rollers 8, 8 to rotate while supporting, at the same time, the load in the thrusting direction applied to the power rollers 8, 8. The thrust ball bearings 26, 26 are respectively constructed by a plurality of balls 29, 29, annular holders 28, 28 which rollably hold the balls 29, 29, and the outer rings 30, 30 serving as thrust track rings. The inner ring tracks or inner race tracks of the thrust ball bearings 26, 26 are formed on the outer surfaces of the power rollers 8, 8, while the outer ring tracks or outer race tracks thereof are formed on the inner surfaces of the outer rings 30, 30.

The thrust needle bearings 27, 27 are constituted by a race 31, a holder 32 and needles 33, 33; the race 31 and the holder 32 are combined such that they are free to slightly shift in the rotational direction. These thrust needle bearings 27, 27 are held between the inner surfaces of the trunnions 6, 6 and the outer surfaces of the outer rings 30, 30 with the races 31, 31 held against the inner surfaces of the trunnions 6, 6. Such thrust needle bearings 27, 27 allow the pivot shafts 22, 22 and the outer rings or outer races 30, 30 to rock around the support shafts 21, 21 while at the same time supporting the thrust load applied to the outer rings 30, 30 by the power rollers 8, 8.

Drive rods 34, 34 are joined to one end, namely the left end in FIG. 4, of the trunnions 6, 6 and drive pistons 35, 35 are secured to the middle outer peripheral surface s of the drive rods 34, 34. These drive pistons 35, 35 are oiltightly fitted in drive cylinders 36, 36, respectively.

A first ball-and-roller bearing 39 is installed at a securing portion between a support wall 38 provided in a casing 37 and the input shaft 15; and a second ball-and-roller bearing 40 is installed at a securing portion between the support wall 38 and the output gear 18. In the example illustrated, as the ball-and-roller bearings 39 and 40, angular ball bearings are used by combining them with their back surfaces facing each other, the directions of the contact angles thereof being opposite from each other. More specifically, outer rings 41, 41 making up the ball-and -roller bearings 39 and 40 are internally fitted in a round hole 43 formed in the support wall 38 and the end surfaces of the outer rings 41, 41 are butt-joined via a spacer 42.

Of inner rings or inner races 44, 44 making up the ball-and-roller bearings 39 and 40, the one constituting the first ball-and-roller bearing 39 is fitted to the outside of a holder 45 which is externally fitted in the outer peripheral surface of the input shaft 15 such that it may be displaced in the axial direction. A flathead spring 47 is clamped between the rear surface (the right surface in FIG. 3) of the holder 45 and a loading nut 46 secured to the outer peripheral surface of the input shaft 15. The flathead spring 47 is provided to apply pre-pressure so as to resiliently hold the inner surfaces 2a and 4a against the peripheral surfaces 8a, 8a of the power rollers 8, 8 even while the pressuring device 101 is "OFF". The inner ring 44 constituting the second ball-and-roller bearing 40 is fitted and secured to the outside of a support cylindrical section 48 formed on the inner peripheral edge portion of the output gear 18.

In the toroidal type continuously variable transmission configured as explained above, the rotation of the input shaft 15 is transmitted to the input disc 2 via the pressuring device 101. Then, the rotation of the input disc 2 is transmitted to the output disc 4 via the pair of the power rollers 8, 8, and the rotation of the output disc 4 is taken out through the output gear 18. When the torque is transmitted as set forth above, the input shaft 15 is pulled leftward in FIG. 3 as the pressuring device 101 operates, causing a leftward thrust load in FIG. 3 to be applied to the first ball-and-roller bearing 39. Further, the output gear 18 is pressed rightward in FIG. 3 via the input disc 2, the power rollers 8, 8, and the output disc 4 as the pressing device 101 is operated, causing a rightward thrust load in FIG. 3 to be applied to the second ball-and-roller bearing 40.

To change the rotational speed ratio of the input shaft 15 to the output gear 18, a pair of the drive pistons 35, 35 are displaced in the opposite directions from each other. As these drive pistons are displaced, the pair of trunnions 6, 6 are accordingly displaced in the opposite directions from each other. As a result, for example, the lower power roller 8 shown in FIG. 4 is displaced to the right in the drawing, while the upper power roller 8 shown in the drawing is displaced to the left in the drawing. This changes the direction of the force in the tangential direction, which force acts on the peripheral surfaces 8a, 8a of the power rollers 8, 8, and the inner surfaces 2a and 4a of the input disc 2 and the output disc 4, respectively. The change in the direction of the force causes the trunnions 6, 6 to rock in the opposite directions from each other in FIG. 3 around the pivots 5, 5 pivotally supported by the support plates 20, 20. As a result, as illustrated in FIGS. 1 and 2, the positions where the peripheral surfaces 8a, 8a of the power rollers 8, 8 are held against the inner surfaces 2a and 4a change accordingly, and the rotational speed ratio of the input shaft 15 to the output gear 18 changes.

As the component parts resiliently deform at the time of power transmission and the power rollers 8, 8 are displaced in the axial direction of the input shaft 15, the displacement shafts 7, 7 pivotally supporting the power rollers 8, 8 slightly move circularly about the supporting shafts 21, 21. This causes the outer surfaces of the outer rings 30, 30 of the thrust ball bearings 26, 26 and the inner surfaces of the trunnions 6, 6 to be relatively displaced. The relative displacement requires a small force because of the presence of the thrust needle bearings 27, 27 between the outer surfaces and the inner surfaces. Hence, only a small force is required to change the tilt angles of the displacement shafts 7, 7.

In the case of the conventional toroidal type continuously variable transmission which is constructed and which operates as set forth above, when transmitting a large torque, the torque or resistance required to rotate the first and second ball-and-roller bearings 39 and 40 inevitably increases, and the loss at the first and second ball-and-roller bearings 39 and 40 accordingly increases, thus failing to ensure satisfactory transmission efficiency in the entire toroidal type continuously variable transmission. This means that the torque required to rotate the ball-and-roller bearings increases as the load applied to the ball-and-roller bearings increases. In the case of the conventional toroidal type continuously variable transmission, the load based on the torque to be transmitted is directly applied to the first and second ball-and-roller bearings 39 and 40, so that the torque required for rotating the two ball-and-roller bearings 39 and 40 increases with resultant deteriorated transmission efficiency as described above.

A toroidal type continuously variable transmission which has been studied mainly as an automotive transmission is equipped with a toroidal speed changing mechanism comprised of an input disc and an output disc which have arc-shaped recessed sections as the surfaces facing each other, and a rotatable power roller held between the two discs. The input disc is driven and coupled to a torque input shaft such that it is able to move in the axial direction of the torque input shaft, whereas the output disc is installed to face against the input disc such that it is able to relatively rotate with respect to the torque input shaft and the movement thereof away from the input disc is limited.

In the toroidal speed changing mechanism constructed as set forth above, the rotation of the input disc causes the output disc to rotate in the opposite direction via the power roller, so that the rotational movement input to the torque input shaft is transmitted to the output disc as the rotational movement in the opposite direction and taken out through an output gear which rotates integrally with the output disc. At this time, the speed is increased from the torque input shaft to the output gear by changing the tilt angles of the rotating shafts of the power rollers such that the peripheral surfaces of the power rollers abut a portion near the outer periphery of the input disc and a portion near the center of the output disc, respectively. Conversely, the speed is decreased from the torque input shaft to the output gear by changing the tilt angles of the rotating shafts of the power rollers such that the peripheral surfaces of the power rollers abut a portion near the center of the input disc and a portion near the outer periphery of the output disc, respectively. A speed change ratio in midway between the two can also be continuously obtained by properly adjusting the tilt angles of the rotating shafts of the power rollers.

A loading cam device for increasing or decreasing the pressing force toward the input shaft in accordance with the input torque is disposed between a loading nut secured to an end of the torque input shaft, the end facing the input disc, and the input disc so as to adjust the frictional force generated between the input disc and the power rollers and between the power rollers and the output disc to proper values at all times. The loading cam device is constituted by: an input disc which has a cam surface extending in the circumferential direction and having projections and depressions, and which is engaged with the torque input shaft to rotate integrally with the torque input shaft; an input disc which has a similar cam surface provided such that it faces the cam surface of the cam disc and which rotates relatively to the torque input shaft; a nearly annular holder placed between the two discs; and rolling members provided at a plurality of openings formed in the circumferential direction of the holder. Each of the rolling members is held so that it is free to roll, the radial direction of the holder being the central axis, at an opening of the holder and it is installed so that the side surfaces thereof abut against the projections and depressions of both cam surfaces of the cam disc 102 and the input disc.

The torque input shaft is supported by a bearing provided on the end facing the input disc and an input bearing provided on the end facing the output disc such that it is rotatable in relation to the casing of the toroidal type continuously variable transmission. The output gear is also supported rotatably in relation to the casing of the toroidal type continuously variable transmission by an output bearing provided on the rear surface of the output gear. The output bearing and the input bearing are respectively held with their rear surfaces butted against each other by a support member joined to the casing of the toroidal type continuously variable transmission; if angular bearings are used, then they are combined so that the directions of the contact angles thereof are opposite from each other.

To transmit the rotational torque supplied to the torque input shaft to the output gear, the loading cam device is operated to move the torque input shaft toward the input disc and to move the output gear toward the output disc. This causes the input bearing to be subjected to a thrust load directed toward the input disc, and the output bearing to be subjected to a thrust load directed toward the output disc.

In the single-cavity, toroidal type continuously variable transmission equipped with only one toroidal speed changing mechanism as explained above, the reaction forces of the input disc and the output disc are large and the thrust loads applied to the output bearing and the input bearing are high, resulting in markedly increased rotational resistance of the bearings in such a case where a high torque is transmitted. This has been posing a problem in that a great loss in the dynamic torque is inevitable, making it impossible for the transmission to maintain satisfactorily high transmission efficiency.

SUMMARY OF THE INVENTION

The present invention has been made with a view toward solving the problems described above, and it is an object of the present invention to improve the transmission efficiency of a single-cavity, toroidal type continuously variable transmission by reducing the loads applied to an output bearing and an input bearing by applying hydraulic forces in the opposite directions from those of the foregoing loads so as to reduce the dynamic torque loss taking place at the bearings. Particularly, it is an object of the present invention to introduce the oil, the pressure of which increases or decreases in accordance with rotational load or gearshift position, to a hydraulic force generator without the need for a dedicated pump.

DESCRIPTION OF THE PREFERRED EMBODIMENTS

Figure 5:
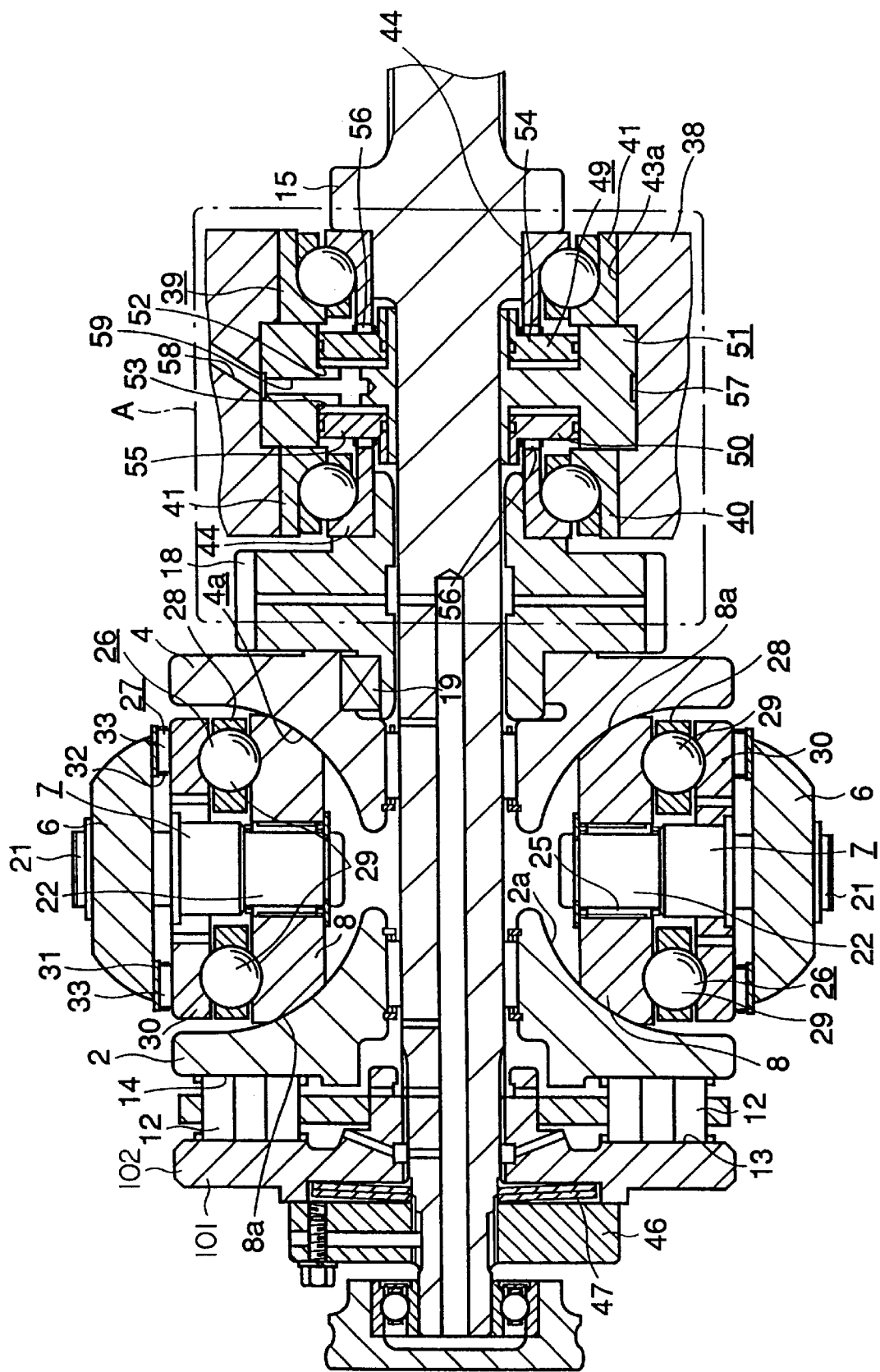
FIG. 5 is a partial sectional view illustrating a first embodiment of the present invention.
Figure 6:
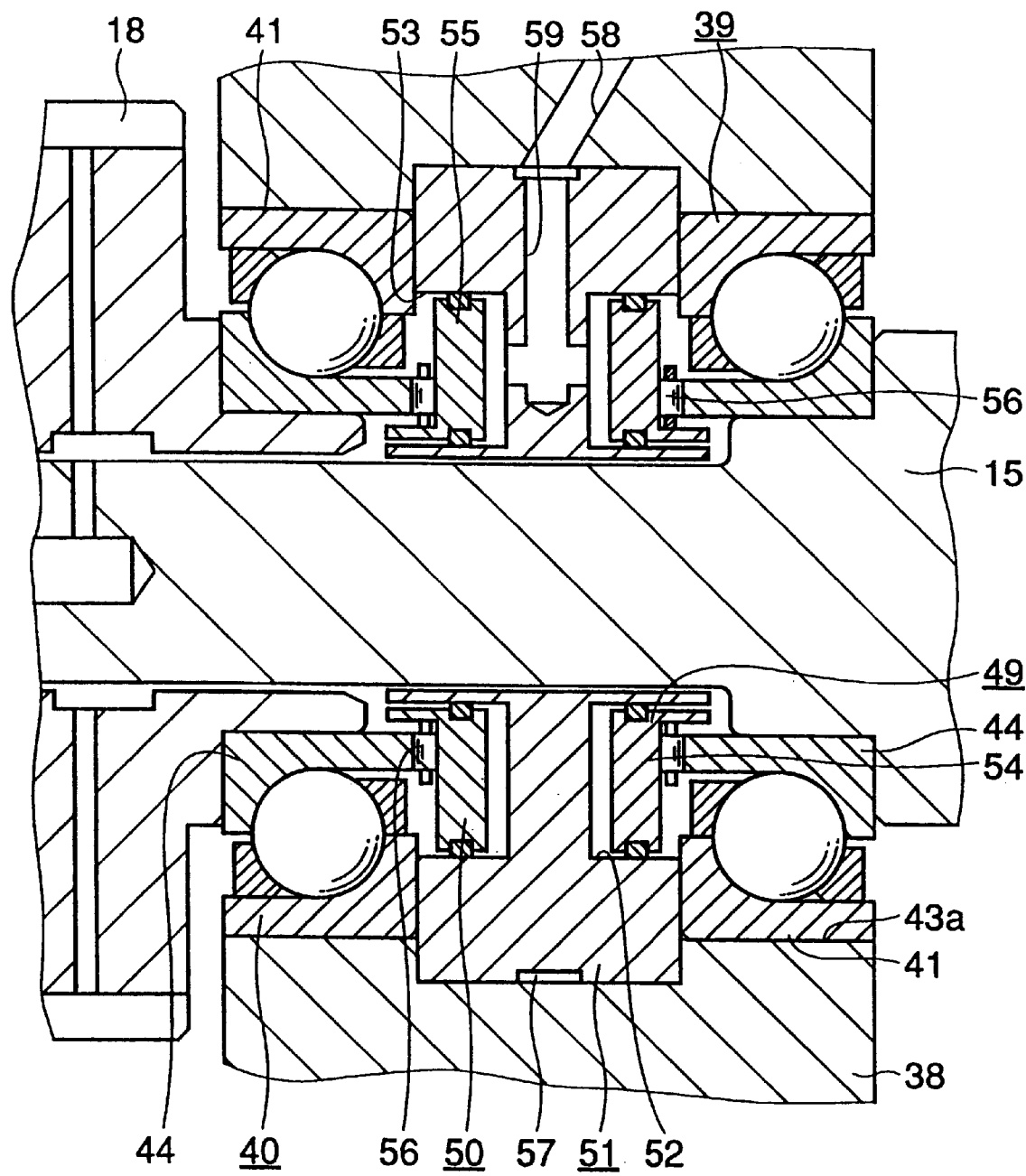
FIG. 6 is an enlarged view of portion A of FIG. 5.

FIGS. 5 and 6 show a first embodiment of the present invention. The present invention is characterized in that the rotational resistance of a first ball-and-roller bearing 39 and a second ball-and-roller bearing 40 is reduced in order to improve the transmission efficiency of a toroidal type continuously variable transmission. The structures and operations of other sections are the same as those of the conventional one explained above; therefore, the explanation of equivalent parts will be omitted or briefed, and the following explanation will place an emphasis primarily on the characteristics of the present invention. The embodiment illustrated is equipped with a flathead spring 47 for applying pre-pressure provided at the rear side, i.e. the left side in FIG. 5, of a cam disc 102 constituting a pressuring device 9 to apply pre-pressure so as to hold inner surfaces 2a and 4a of an input disc 2 and an output disc 4, respectively, against peripheral surfaces 8a, 8a of power rollers 8, 8 even while the pressuring device 101 is "OFF". More specifically, a loading nut is fixed on a portion of an end (a left end in FIG. 5) of an input shaft 15, which is a rotating shaft, the portion jutting out of the rear of the cam disc 102; the flathead spring 47 is provided between the front of the loading nut 46 (the right surface in FIG. 5) and the rear of the cam disc 102. The mounting position of the flathead spring 47, however, has nothing to do with the intention of the present invention.

Figure 1:
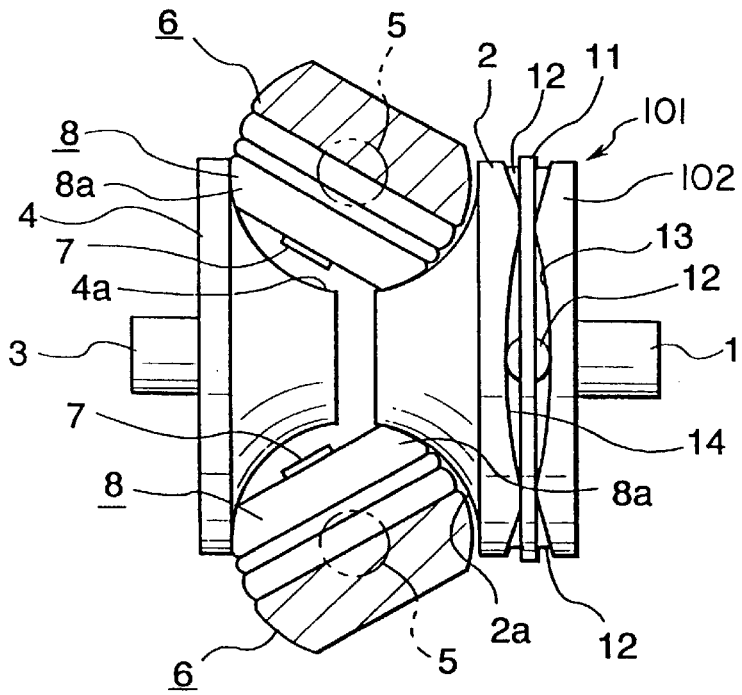
FIG. 1 is a side view showing the basic configuration of a conventional toroidal type continuously variable transmission in a state where speed has been reduced to a maximum.
Figure 2:
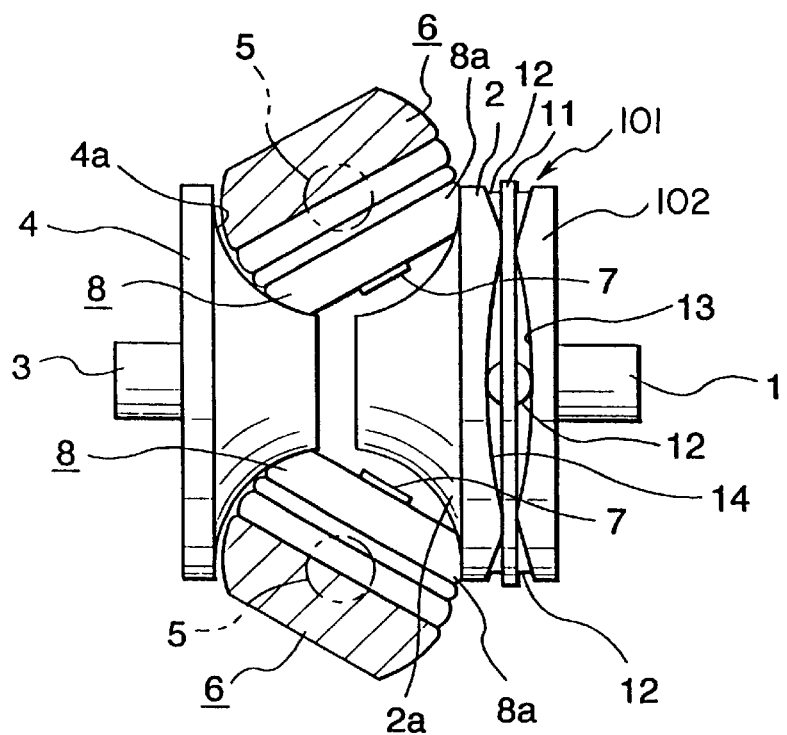
FIG. 2 is a side view showing the basic configuration of a conventional toroidal type continuously variable transmission in a state where speed has been increased to a maximum.
Figure 3:
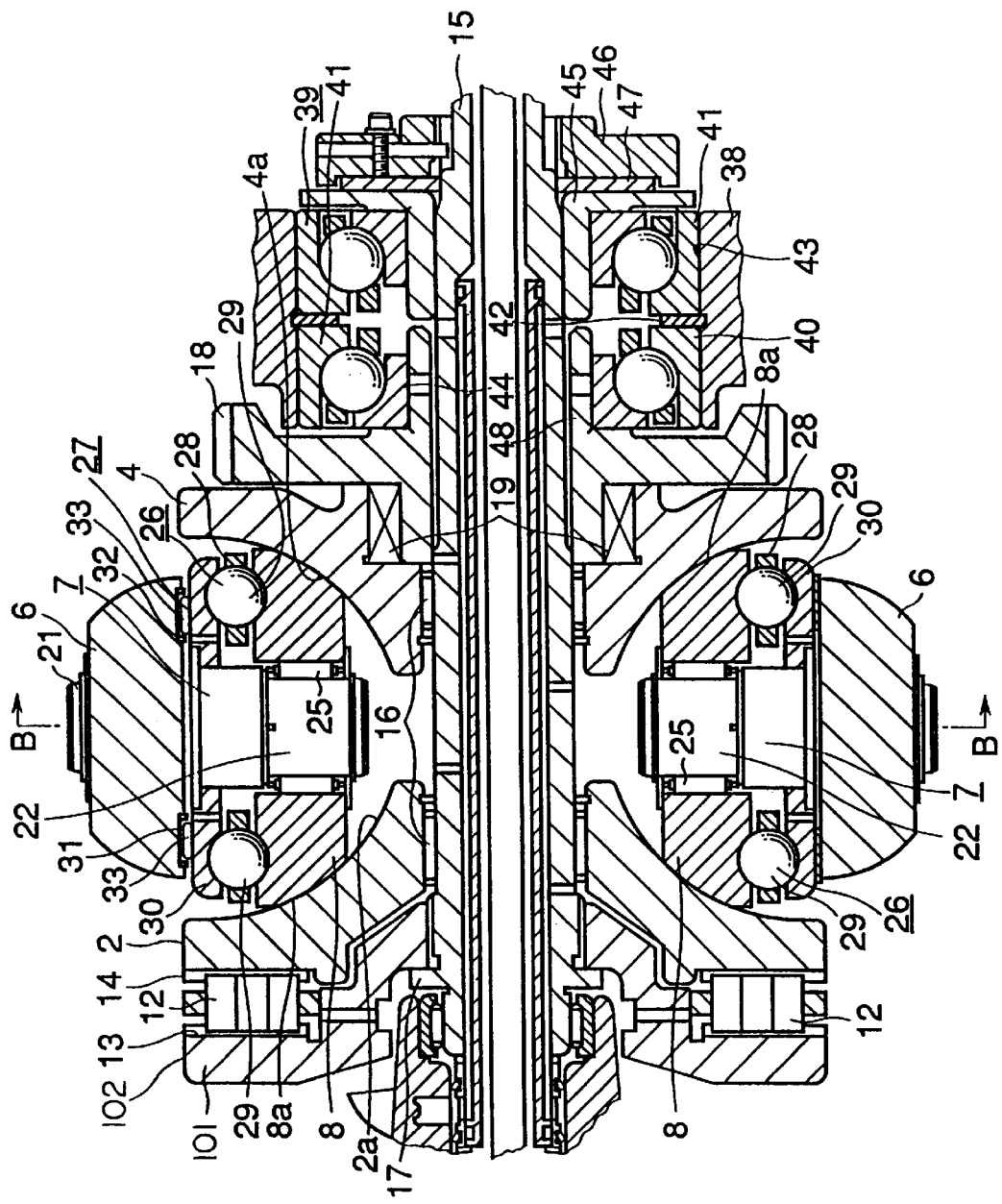
FIG. 3 is a sectional view illustrating an example of a conventional specific structure.
Figure 4:
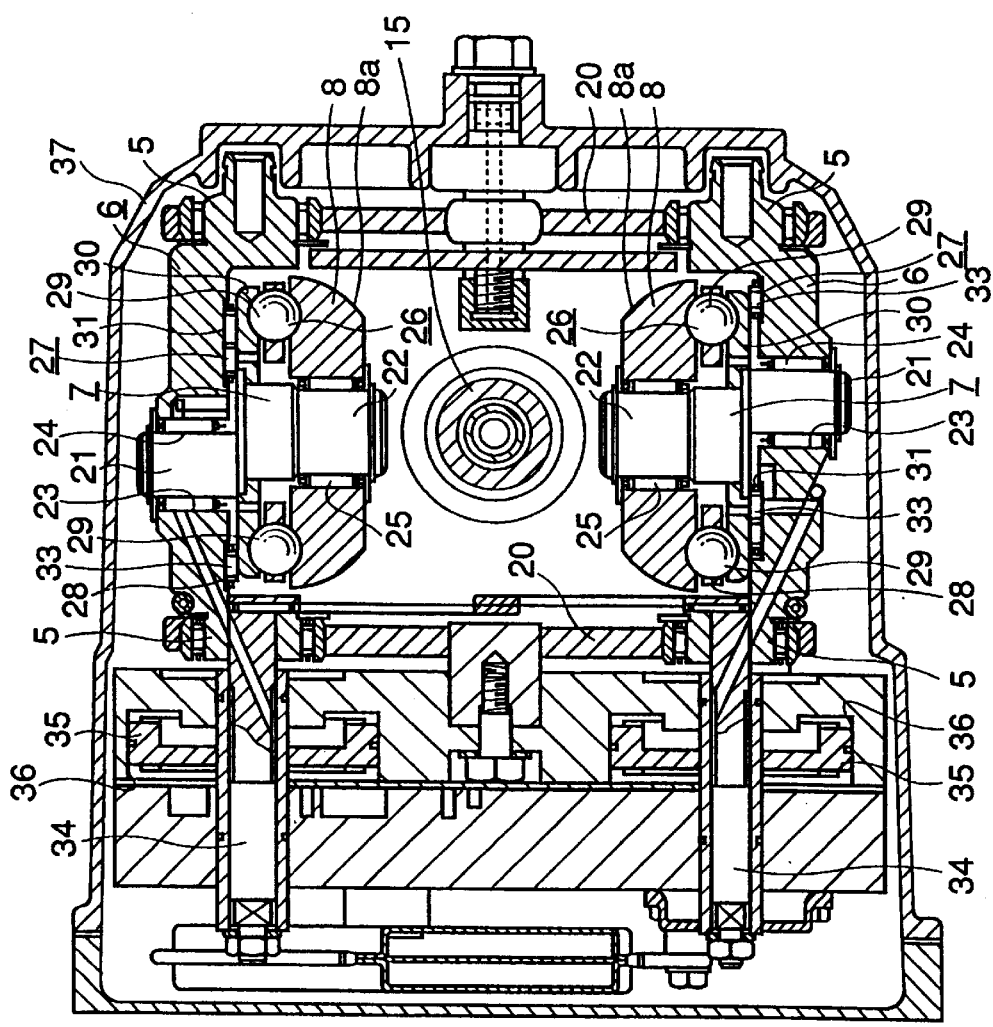
FIG. 4 is a sectional view at the line B—B of FIG. 3.

In the toroidal type continuously variable transmission according to the present invention, a first hydraulic cylinder 49 and a second hydraulic cylinder 50 are provided adjacently to the first ball-and-roller bearing 39 and the second ball-and-roller bearing 40, respectively. A thick annular cylinder block 51 is secured by fitting it on an axial mid portion of a round hole 43a formed in a support wall 38 in a casing 37 (refer to FIG. 4). The casing 37 and the support wall 38 are split into two sections, so that the outer peripheral portion of the cylinder block 51 can be fitted in the recessed section formed on the inner peripheral surface of the mid portion of the round hole 43a as illustrated in the drawing without any particular problem. A first cylinder bore 52 and a second cylinder bore 53 having round cross-sections are formed near the inside diameters of both end surfaces in the axial direction of the cylinder block 51. A first piston 54 is oiltightly fitted so as to provide an oil tight barrier in the first cylinder bore 52, and a second piston 55 is oiltightly fitted so as to provide an oil tight barrier in the second cylinder bore 53, thus making up the first hydraulic cylinder 49 and the second hydraulic cylinder 50. The first and second pistons 54 and 55 are respectively opposed to inner rings 44, 44 constituting the first ball-and-roller bearing 39 and the second ball-and-roller bearing 40. As the pressure oil is supplied into the first cylinder bore 52 and the second cylinder bore 53, the first piston 54 and the second piston 55 are pushed from the cylinder bores 52 and 53, respectively, thus pushing them away from the cylinder block 51, via thrust roller bearings 56, 56, along the inner rings 44, 44 serving as a first track ring or first bearing race and a second track ring or second bearing race.

Provided inside the support wall 38 and the cylinder block 51 is an oil supply and discharge passage which enables pressure oil to be supplied to or discharged from the first cylinder bore 52 and the second cylinder bore 53. To be more specific, a groove 57 is formed fully around the outer peripheral surface of the cylinder block 51 in communication with a first supply and discharge port 58 which is provided in the support wall 38 and which has one end thereof opened on the inner peripheral surface of the round hole 43a. Sealing members 120 are placed where the cylinder block 51 and support wall 38 are joined, thereby providing an oil tight barrier. A second supply and discharge port 59 is provided in the cylinder block 51 and it has one end thereof opened to the bottom of the groove 57, while the other end thereof opened to the bottoms of the first cylinder bore 52 and the second cylinder bore 53. The other end of the first supply and discharge port 58 is in communication with a pressure oil source, which is not shown. Preferably, the pressure oil source is capable of supplying oil pressure which changes according to the operating condition such as load or speed change ratio of the toroidal type continuously variable transmission. For instance, the following may be used: the oil pressure on the high pressure side which rises according to the traction force between the inner surfaces 2a and 4a of the input disc 2 and the output disc 4, respectively, and the peripheral surfaces 8a, 8a of the power rollers 8, 8, or the differential pressure based on the oil pressure on the high pressure side and the oil pressure on the low pressure side, or a line pressure which has been controlled through a pressure regulator or a regulator valve.

The first piston 54 and the second piston 55 respectively fitted in the first cylinder bore 52 and the second cylinder bore 53 described above push the inner rings 44, 44, which constitute the first ball-and-roller bearing 39 and the second ball-and-roller bearing 40, in such directions as to move them apart from each other in order to transmit a torque through the toroidal type continuously variable transmission. In other words, when the toroidal type continuously variable transmission is operated, the input shaft 15 is pulled toward the left in FIGS. 5 and 6 as the pressuring device 101 is actuated. This causes a first thrust load, which is directed to the left in FIGS. 5 and 6, to be applied to the inner ring 44 which constructs the first ball-and-roller bearing 39 and which serves as the first track ring positioned on the input end of the first thrust load applied from the input shaft 15. In addition, an output gear 18 is pushed to the right in FIGS. 5 and 6 by the output disc 4, which is the second disc, as the pressuring device 101 is actuated. This causes a second thrust load, which is directed to the right in FIGS. 5 and 6, to be applied to the inner ring 44 which constructs the second ball-and-roller bearing 40 and which serves as the second track ring positioned on the input end of the second thrust load.

Thus, when the toroidal type continuously variable transmission is in operation, the pair of the inner rings 44, 44 are subjected to the first and second thrust loads, which act to bring the two inner rings 44, 44 toward each other, as the pressing device 101 is operated. The first piston 54 and the second piston 55 push the two rings 44, 44 to move them away from each other according to the pressure oil supplied into the first cylinder bore 52 and the second cylinder bore 53 making up the first hydraulic cylinder 49 and the second hydraulic cylinder 50. More specifically, the first piston 54 pushes the inner ring 44 constituting the first ball-and-roller bearing 39 in a direction opposite from the direction in which the first thrust load is applied, while it pushes the inner ring 44 constituting the second ball-and-roller bearing 40 in a direction opposite from the direction in which the second thrust load is applied. Thus, the pair of inner rings 44, 44 positioned on the thrust load input end are pushed in the opposite directions from those in which the thrust loads act on the inner rings 44, 44; hence, the thrust loads applied to the first ball-and-roller bearing 39 and the second ball-and-roller bearing 40 can be reduced, leading to lower rotational resistance of the first ball-and-roller bearing 39 and the second ball-and-roller bearing 40. The forces of the first piston 54 and the second piston 55 for pushing the inner rings 44, 44 are set so that they are smaller than the first and second thrust loads. Thus, the pre-pressures of the first ball-and-roller bearing 39 and the second ball-and-roller bearing 40 will be lost, ensuring smooth rotation of these ball-and-roller bearings 39 and 40.

Figure 7:
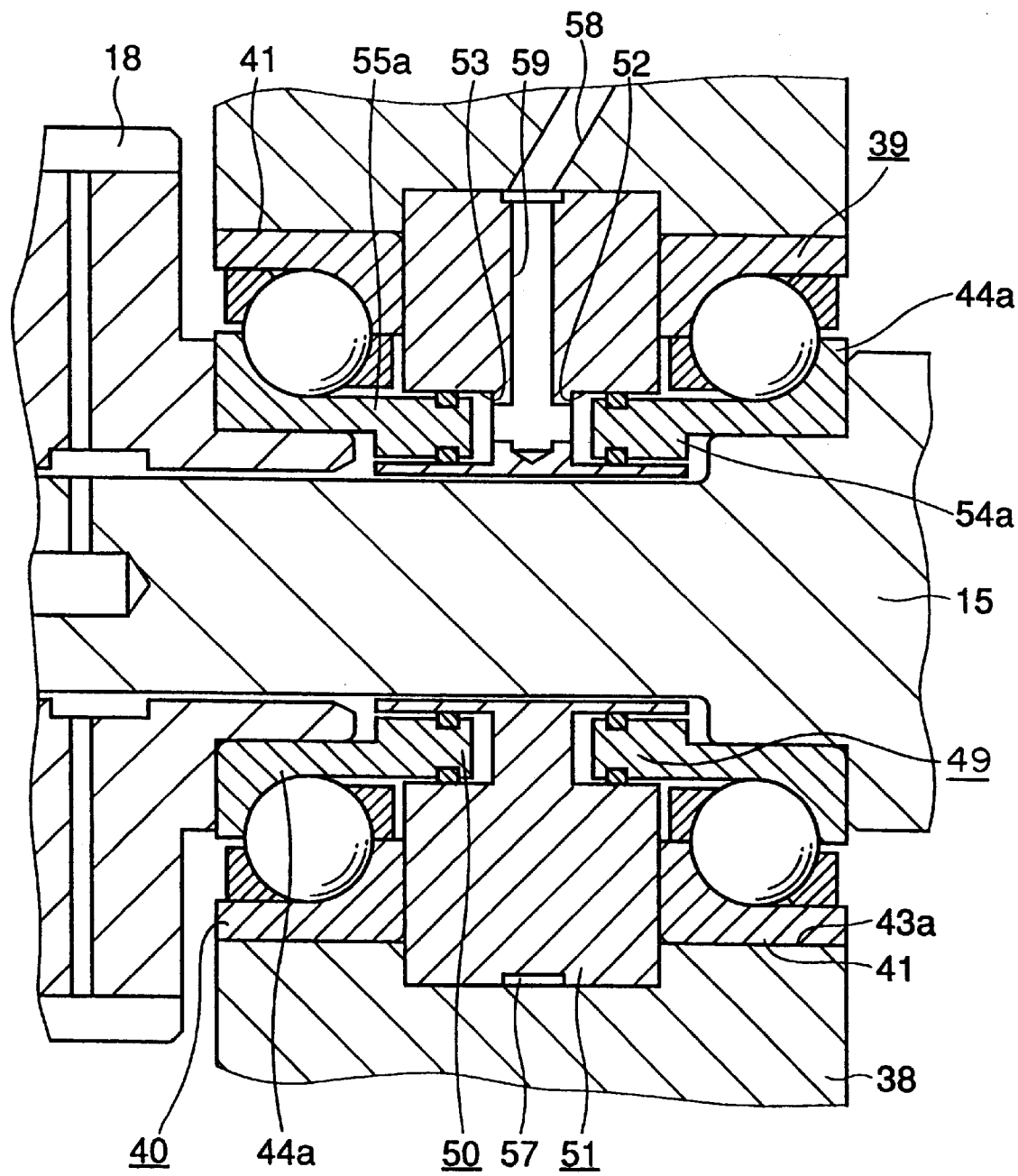
FIG. 7 is a diagram illustrating a second embodiment of the present invention and it is a similar enlarged view to FIG. 6.

FIG. 7 shows a second embodiment of the present invention. In this embodiment, inner rings 44a, 44a which make up the first ball-and-roller bearing 39 and the second ball-and-roller bearing 40 and which serve as the first track ring and the second track ring, respectively, are made integral with first piston 54a and the second piston 55a making up the first hydraulic cylinder 49 and the second hydraulic cylinder 50. Accordingly, in the second embodiment, when the toroidal type continuously variable transmission is actuated, the first piston 54a and the second piston 55a rotate in the first cylinder bore 52 and the second cylinder bore 53, respectively. For this reason, this embodiment employs a slippery material for the sealing to provide oiltightness between the first piston 54a and the second piston 55a, and the first cylinder bore 52 and the second cylinder bore 53. The rest of the configuration and operations of the second embodiment is the same as the first embodiment set forth above.

Figure 8:
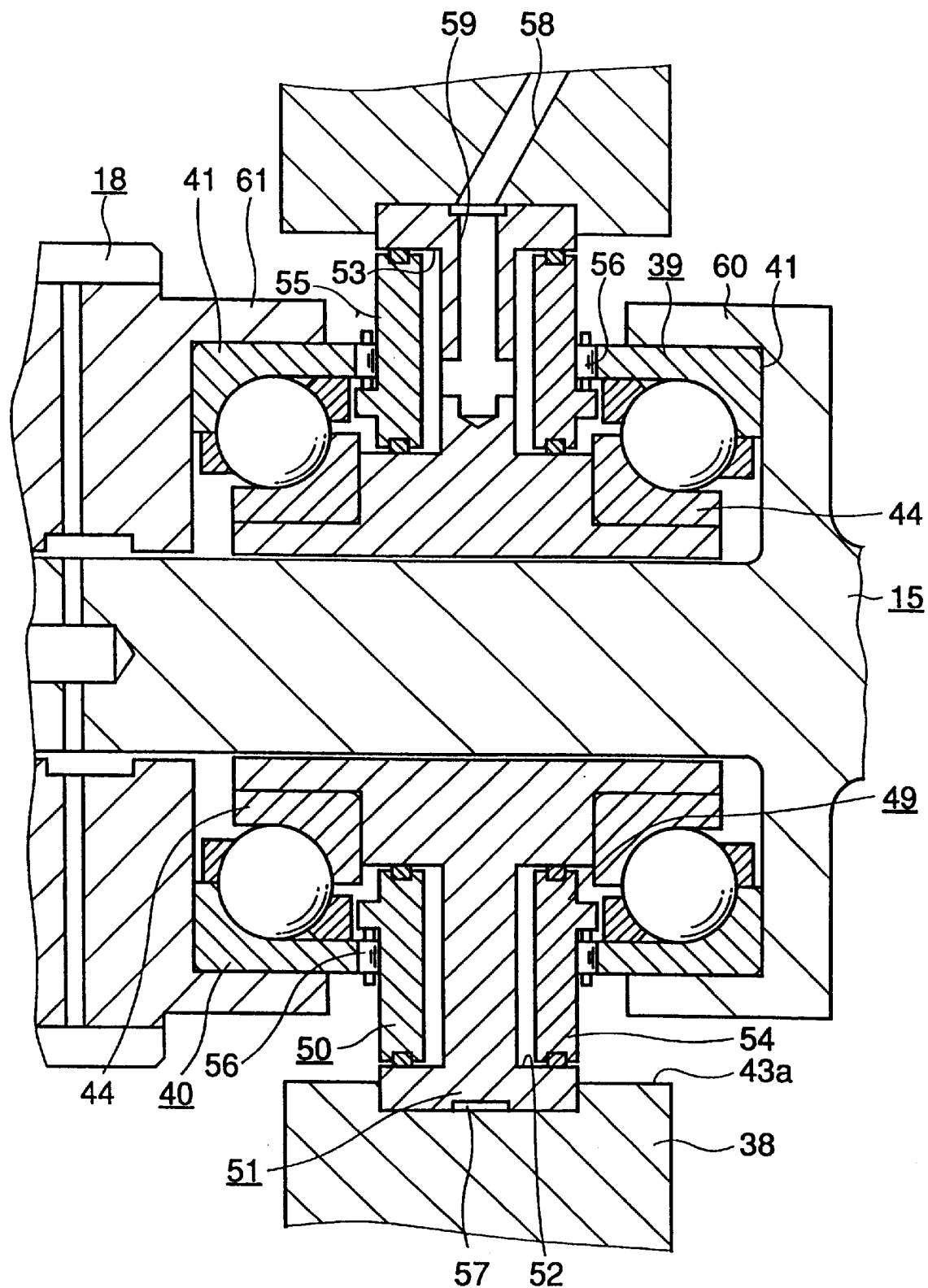
FIG. 8 is a diagram illustrating a third embodiment of the present invention and it is a similar enlarged view to FIG. 6.

FIG. 8 shows a third embodiment of the present invention. In this embodiment, an outer ring 41 constituting the first ball-and-roller bearing 39 serves as the first track ring positioned on the input end of the first thrust load applied by the input shaft 15. Further, another outer ring 41 constituting the second ball-and-roller bearing 40 serves as the second track ring positioned on the input end of the second thrust load applied via the output gear 18 from the output disc 4 serving as the second disc (refer to FIG. 5). Hence, a holder 60 having a relatively large diameter is secured on the outer peripheral surface of the mid portion of the input shaft 15, and the outer ring 41 constituting the first ball-and-roller bearing 39 is fitted to the inside of the holder 60. A holding cylinder 61 is formed on a portion near the outer periphery of one surface, namely, the right surface in FIG. 8, of the output gear 18; and the outer ring 41 constituting the second ball-and-roller bearing 40 is secured by fitting it to the inside of the holding cylinder 61. The configuration and operations of the third embodiment are the same as those of the first embodiment except that the inner rings 44, 44 serving as the first and second track rings supporting the first and second thrust loads have been replaced by the outer rings 41, 41.

Figure 9:
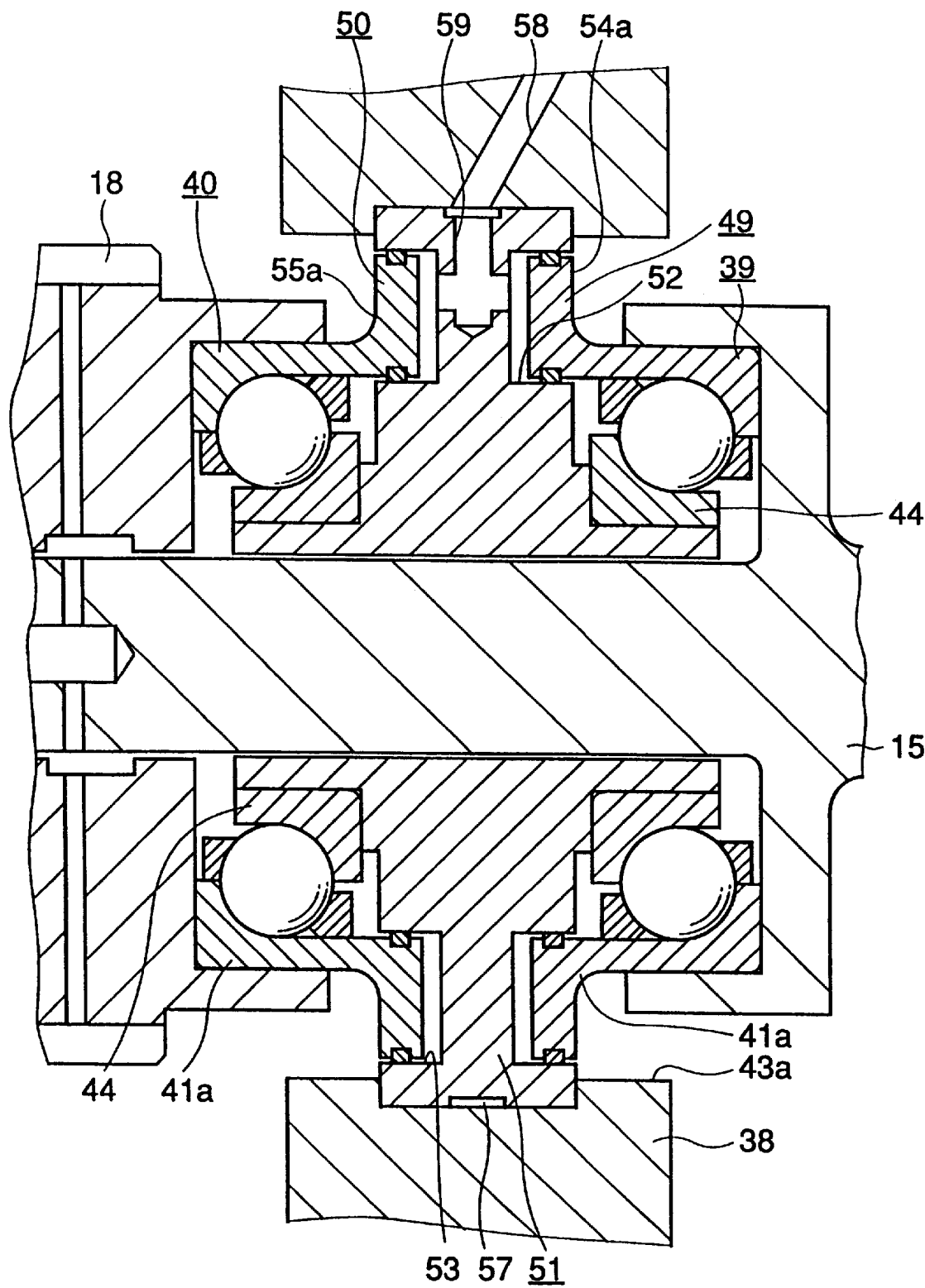
FIG. 9 is a diagram illustrating a fourth embodiment of the present invention and it is a similar enlarged view to FIG. 6.

FIG. 9 shows a fourth embodiment of the present invention. In this embodiment, inner rings 44a, 44a which make up the first ball-and-roller bearing 39 and the second ball-and-roller bearing 40 and which serve as the first track ring and the second track ring are made integral with the first piston 54a and the second piston and 55a making up the first hydraulic cylinder 49 and the second hydraulic cylinder 50. The configuration and operations of the fourth embodiment are the same as those of the second embodiment except that the inner rings 44, 44 serving as the first and second track rings supporting the first and second thrust loads have been replaced by the outer rings 41a, 41a.

The single-cavity, toroidal type continuously variable transmission in accordance with the present invention is characterized by the structure wherein a hydraulic force generator is provided at the portion where an output bearing and an input bearing are mounted; and the rest of the transmission including the toroidal speed changing mechanism can be configured in the same manner as that for a conventional one.

In general, it is necessary to introduce high-pressure oil into the hydraulic force generator to increase the hydraulic force applied to the output bearing and the input bearing. Providing a dedicated hydraulic circuit equipped with an independent oil supply pump, however, is not appropriate, because it would be against the demand for lower manufacturing cost and reduced weight of the entire toroidal type continuously variable transmission.

In the toroidal type continuously variable transmission, there is a tendency in that the reaction forces from the output disc and the input disc increase as the input torque increases, and larger reaction forces appear when speed is decreased than it is increased. As the reaction forces from the output disc and the input disc increase, the thrust loads on the output bearing and the input bearing which are subjected to the reaction forces accordingly increase, resulting in an increase in the power transmission loss generated at the bearings as the input torque increases. The magnitude of the reaction force from the input disc is proportional to the magnitude of the input torque; however, it has no connection with the magnitude of the speed change ratio relative to the output disc.

In view of the foregoing, it is most desirable to introduce an oil, the pressure value of which increases or decreases according to rotational load or gearshift position, into the hydraulic force generator. Hence, the single-cavity, toroidal type continuously variable transmission has a branched high-pressure hydraulic line employed in a speed change control hydraulic circuit to introduce a part of the oil in the line into the hydraulic force generator so that the pressuring force of an appropriate value is applied to the output bearing and the input bearing at all times while minimizing the power transmission loss.

Figure 10:
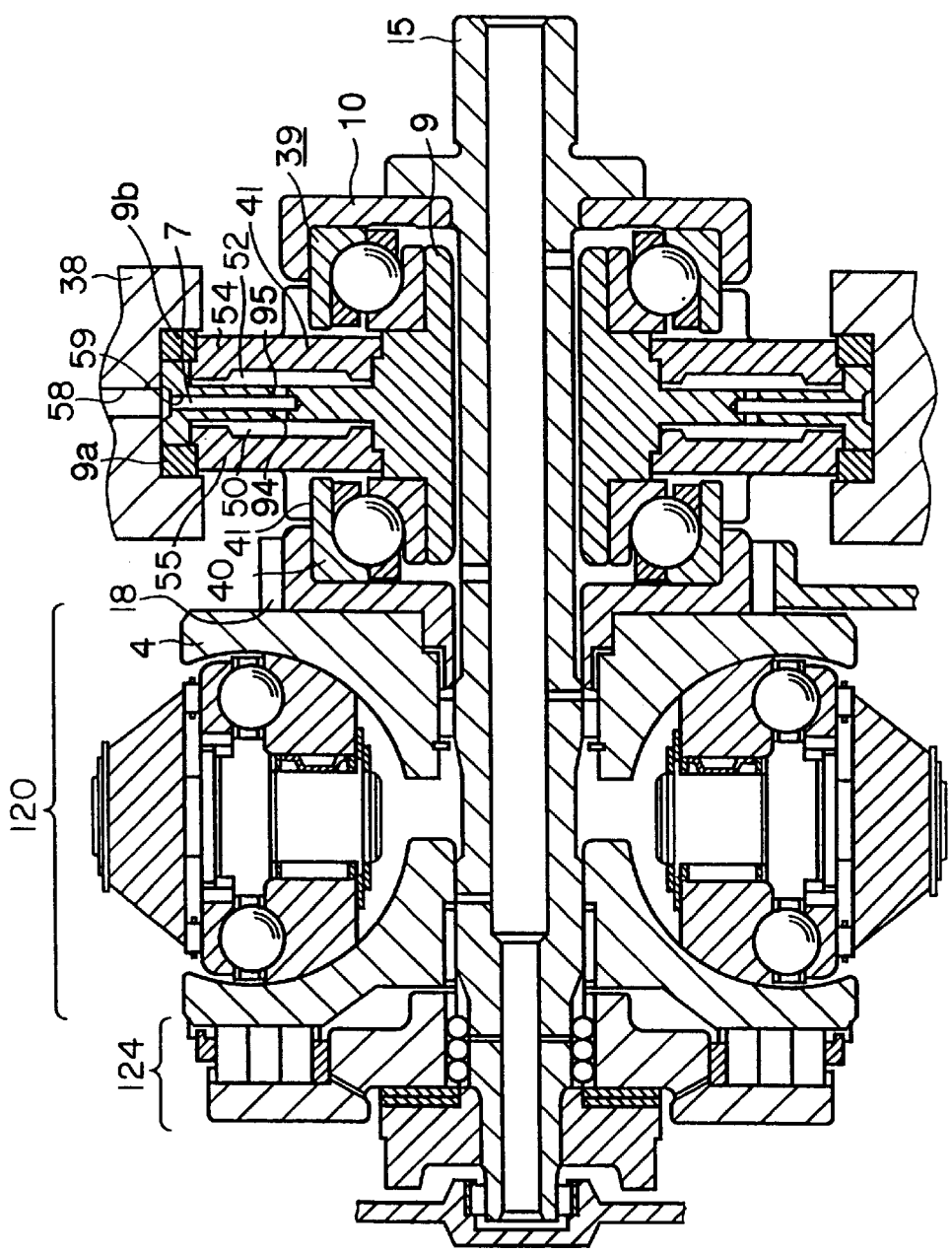
FIG. 10 is an axial sectional view illustrating an embodiment of a single-cavity, toroidal type continuously variable transmission in accordance with the present invention.

FIG. 10 is an axial sectional view illustrating an embodiment of a single-cavity, toroidal type continuously variable transmission in accordance with the present invention. As in the case of the conventional toroidal type continuously variable transmission previously discussed, the embodiment is also equipped with a torque input shaft 15, a toroidal type speed changing mechanism 120, an output gear 18, a loading cam device 124, an output bearing 40 and an input bearing 39; angular bearings are used for the output bearing 40 and the input bearing 39. In the single-cavity, toroidal type continuously variable transmission in accordance with the present invention, a hydraulic force generator 117 for applying outward hydraulic forces to outer rings 41 and 41 of the aforesaid bearings is provided adjacently to the output angular bearing 40 and the input angular bearing 39.

Figure 11:
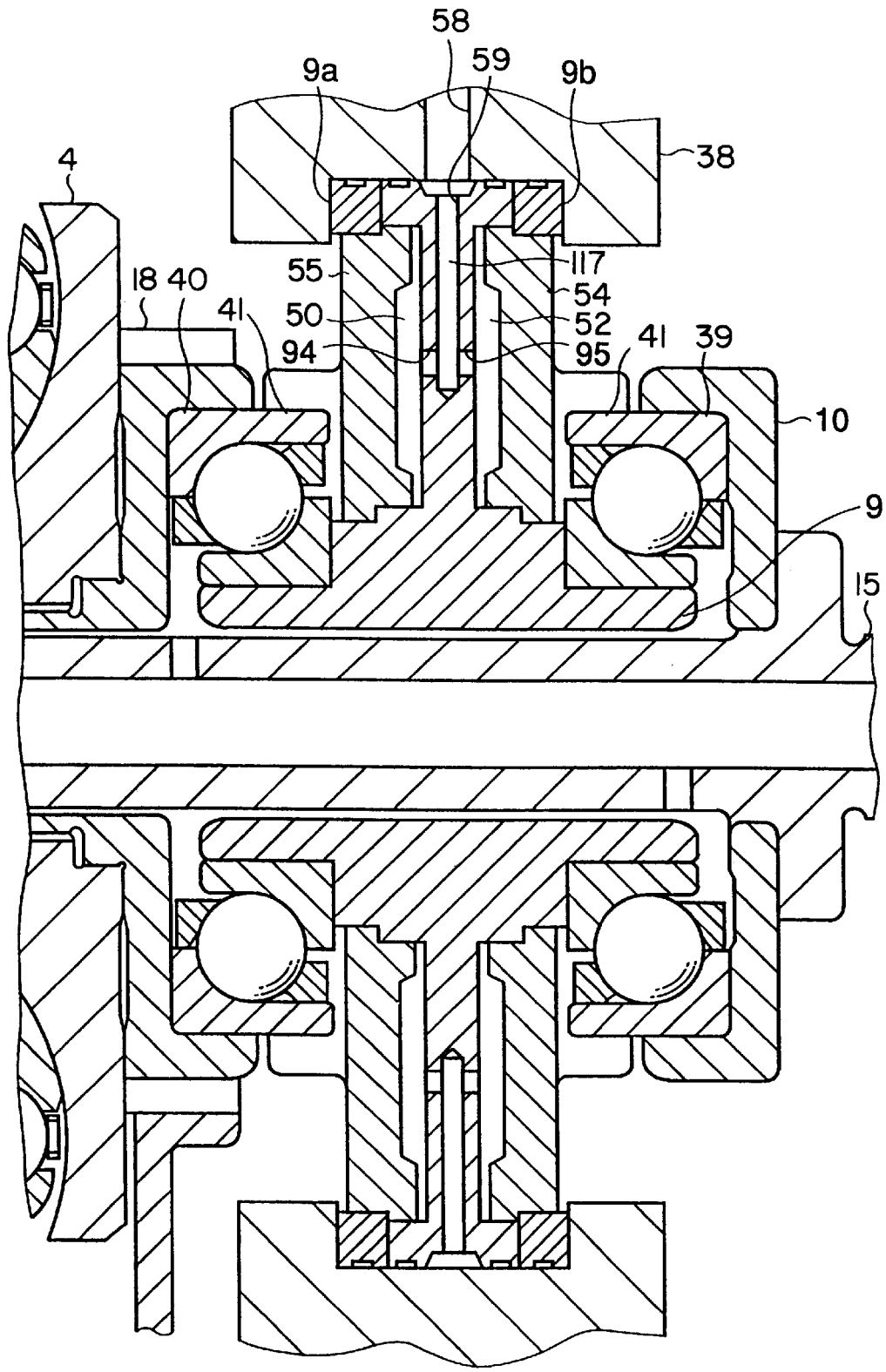
FIG. 11 is an enlarged view of an area around the portion where an output bearing and an input bearing are mounted in the embodiment of the single-cavity, toroidal type continuously variable transmission in accordance with the present invention shown in FIG. 10.

FIG. 11 is an enlarged view of an area around the portion where the output bearing 40 and the input bearing 39 are mounted in the embodiment shown in FIG. 10. The output gear 18, the output angular bearing 40, a support member 9, the input angular bearing 39, and a flange member 10 are disposed along the torque input shaft 15 in the order in which they are listed from an output disc 4.

The support member 9 is provided between the output angular bearing 40 and the input angular bearing 39; it is fitted in a circular groove formed in the circumferential direction on the inner wall surface of a casing 38 of the toroidal type continuously variable transmission, and it does not rotate. Provided at the inner peripheral sections of both end surfaces of the support member 9 are two cylinders 50 and 52 which respectively have round cross sections concentric with the torque input shaft 15 and which are opposed to each other, the two cylinders being provided around the torque input shaft 15. Thick, disc-shaped pistons 55 and 54 are fitted in the cylinders 50 and 52, respectively; the piston surfaces of the pistons 55 and 54 are respectively held against the outer rings 41 and 41 of the output angular bearing 40 and the input angular bearing 39, respectively.

The cylinders 50 and 52 and the pistons 55 and 54 make up the hydraulic force generator 117. The oil introduced from a high-pressure hydraulic circuit (FIG. 12), the pressure of which rises as the traction force increases, or the oil introduced from the hydraulic circuit (FIG. 12) of a line pressure and adjusted through a pressure regulator (FIG. 12) is introduced through a common oil passage 59, which is provided in the support member 9, from a supply port 58 of the casing 38, and it is supplied into the cylinders 50 and 52 via oil ports 94 and 95 drilled in the bottom surfaces of the cylinders 91 and 92. The hydraulic force generator 117 drives the pistons 55 and 54 fitted in the cylinders 50 and 52, respectively, toward the torque input shaft 15 extending direction so as to push the outer rings 41 and 41 of the output angular bearing 40 and the input angular bearing 39, respectively, thereby reducing the thrust loads applied to these outer rings 41 and 41. Hence, the actual force applied to the outer rings 41 and 41 of the angular bearings 40 and 39, respectively, is the force obtained by subtracting the hydraulic forces of the pistons 55 and 54 from the reaction forces of the input and output discs; therefore, the thrust loads received by the balls of the angular bearings 40 and 39 from the outer rings 41 and 41 and transmitted to the inner rings are greatly reduced. The thrust loads applied to the two outer rings 41 and 41 are in opposite directions from each other and partly cancel each other, so that the difference is transmitted to the casing 38 of the toroidal type continuously variable transmission via the support member 9.

Figure 12:
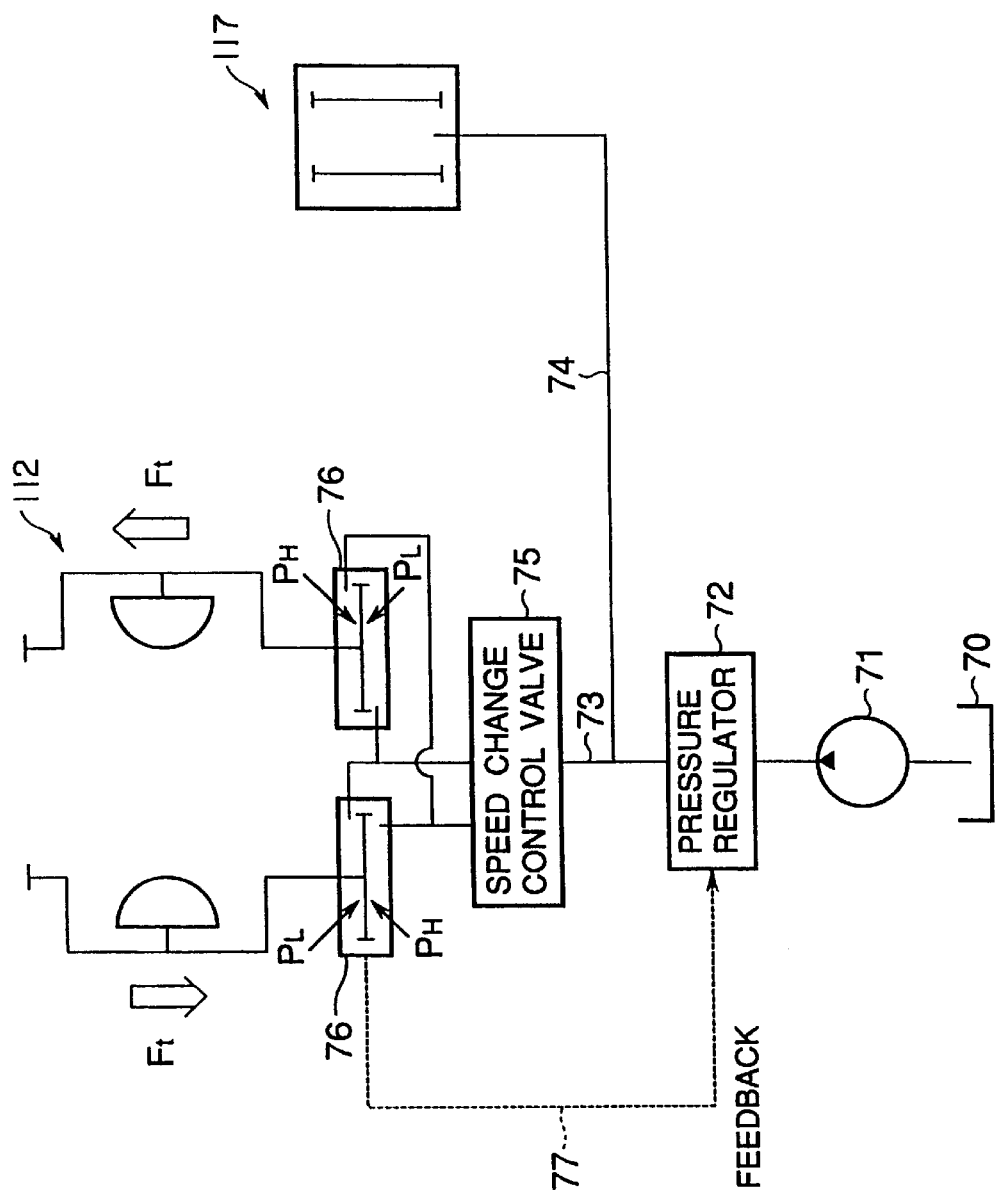
FIG. 12 is a schematic diagram illustrating an embodiment of a hydraulic circuit employed for the single-cavity, toroidal type continuously variable transmission in accordance with the present invention.

FIG. 12 shows an example of the configuration of the hydraulic circuit for supplying the hydraulic oil to the hydraulic force generator 117. The hydraulic circuit has a branch point in the middle of a main line 73 of the hydraulic circuit used for speed change ratio control in the toroidal speed changing mechanism 112; a part of the hydraulic oil is taken and led out through a branch line 74 so that the hydraulic force generator 117 generates appropriate oil pressure. The hydraulic oil is stored in a storage tank 70; it is sent out from an oil supply pump 71 and it goes through a pressure regulator 72 so as to adjust the pressure thereof to a line pressure required for speed change control before it is fed into the main line 73.

Beyond the main line 73, there are provided a speed change control valve 75 and speed change control hydraulic cylinders 76, 76. The speed change control valve 75 is opened or closed to control the supply of the hydraulic oil to the speed change control hydraulic cylinders 76, 76, namely a high-pressure cylinder and a low-pressure cylinder. These two speed change control hydraulic cylinders 76, 76 drive the two power rollers of the toroidal speed changing mechanism 112 in opposite directions from each other (the directions indicated by "Ft" in the drawing) according to the pressure difference of the hydraulic oil supplied to the high-pressure cylinder and the low-pressure cylinder. This adjusts the tilt angles of power roller rotating shafts to permit the control of the speed change ratio of the toroidal type continuously variable transmission. In the two speed change control hydraulic cylinders 76, 76 of this hydraulic circuit, the cylinder chamber indicated by "PH" serves as the high-pressure cylinder, while the cylinder chamber indicated by "PL" serves as the low-pressure cylinder.

Furthermore, the hydraulic oil having the pressure PH in the high-pressure cylinder and the hydraulic oil having the pressure PL in the low-pressure cylinder are fed back to the pressure regulator 72 through a feedback line 77 indicated by the dashed line in FIG. 12 so as to permit proper adjustment of the line pressure by the pressure regulator 72. This enables the oil introduced from the branch line 74 into the hydraulic force generator 7 to have the line pressure which increases or decreases according to the rotational load or gearshift position of the toroidal speed changing mechanism 112. Thus, the thrust loads on the output bearing and the input bearing can be reduced in response to the reaction forces of the output disc and the input disc that increase as the input torque increases.

The same advantage as that described above can be obtained even if the oil of the high-pressure line which has been adjusted in oil pressure by the pressure regulator 72 is replaced by one of the types of oil listed below and introduced into the hydraulic force generator 117: an oil having the pressure of the high-pressure line, an oil having the pressure of the high-pressure cylinder subjected to the traction force, an oil having a pressure produced by adjusting the pressure of the high-pressure cylinder subjected to the traction force by the pressure regulator 72, or an oil having the pressure based on the difference in pressure between the high-pressure cylinder and the low-pressure cylinder.

In the embodiment shown in FIGS. 10 and 11, the output angular bearing 40 is made integral with the output gear 18 and it rotates integrally with the output disc 4 and the output gear 18. In this embodiment, the rear surface of the output gear 18 is provided with an annular depression in which the outer ring 41 of the output angular bearing 40 fits so that the output angular bearing 40 goes in the inside diameter portion of the output gear 18. This structure makes it possible to enhance the rotational rigidity of the portion where the output gear 18 and the output angular bearing 40 are joined. Moreover, the torque input shaft 15 can be made shorter than in a regular serial design, thus contributing to a reduced size of the entire toroidal type continuously variable transmission.

The input angular bearing 39 is integral with the torque input shaft 15 via the flange member 10; it rotates integrally with the torque input shaft 15 and the flange member 10 joined to the torque input shaft 15. In this embodiment, the outer ring 41 of the input angular bearing 39 if fitted or press-fitted to the disc-shaped flange member 10, and the flange member 10 is also fitted to the collar provided on the side edge of the output gear 18 of the torque input shaft 15. The flange member 10 and an end of the torque input shaft 15 may be joined by press-fitting or spline-joining instead of fitting.

Thus, when mounting the input angular bearing 39, the flange member 10 can be formed as a separate, independent component, eliminating the need for machining the end of the torque input shaft 15 into a complicated shape required for guiding the outer ring 41 of the angular bearing 39. This permits markedly reduced manufacturing cost and markedly easier machining.

In the construction set forth above, the outer rings 41 and 41 of the output angular bearing 40 and the input angular bearing 39, respectively, are independently and rotatably held, whereas the inner rings of the two bearings do not rotate because they are secured to the inner surface of the support member 9.

Further in this embodiment, the diameters of the outer peripheries of the pistons 55 and 54 are larger than the outside diameters of the outer rings 41 and 41 of the output angular bearing 40 and the input angular bearing 39. This makes it possible for the inner walls of the piston surfaces to secure larger areas to receive the oil pressures in the cylinders 50 and 52, so that a higher hydraulic force can be produced to further reduce the thrust loads applied to the output angular bearing and the input angular bearing.

Figure 13:
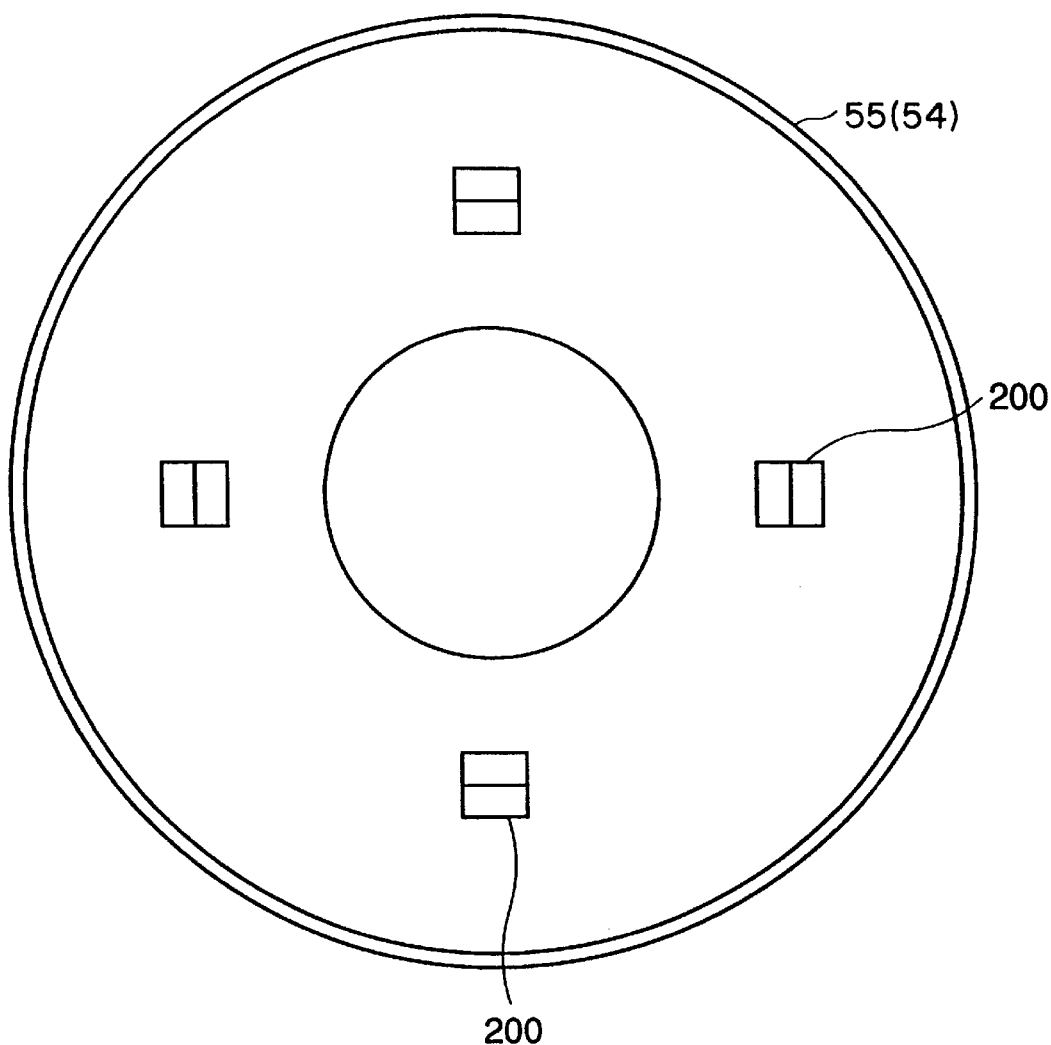
FIG. 13 is a front view showing an embodiment of a piston constituting the single-cavity, toroidal type continuously variable transmission in accordance with the present invention.
Figure 14:
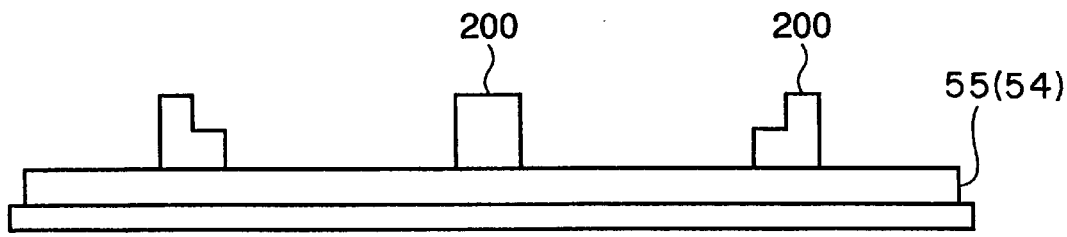
FIG. 14 is a cross-sectional view of the embodiment of the piston shown in FIG. 13.

Further in this embodiment, the output piston 55 and the input piston 54 are joined to the bearing outer rings 41 and 41 against which the pistons abut, so that they rotate as one piece. FIG. 13 is a front view showing the pistons 55 and 54; and FIG. 14 is a cross-sectional view thereof. There are four protuberances 200 formed in the circumferential direction on the surface of each piston. The protuberances 200 have steps oriented in the radial direction; the end faces closer to the outer peripherals of the individual protuberances are made taller than those closer to the inner peripherals thereof.

Figure 15:
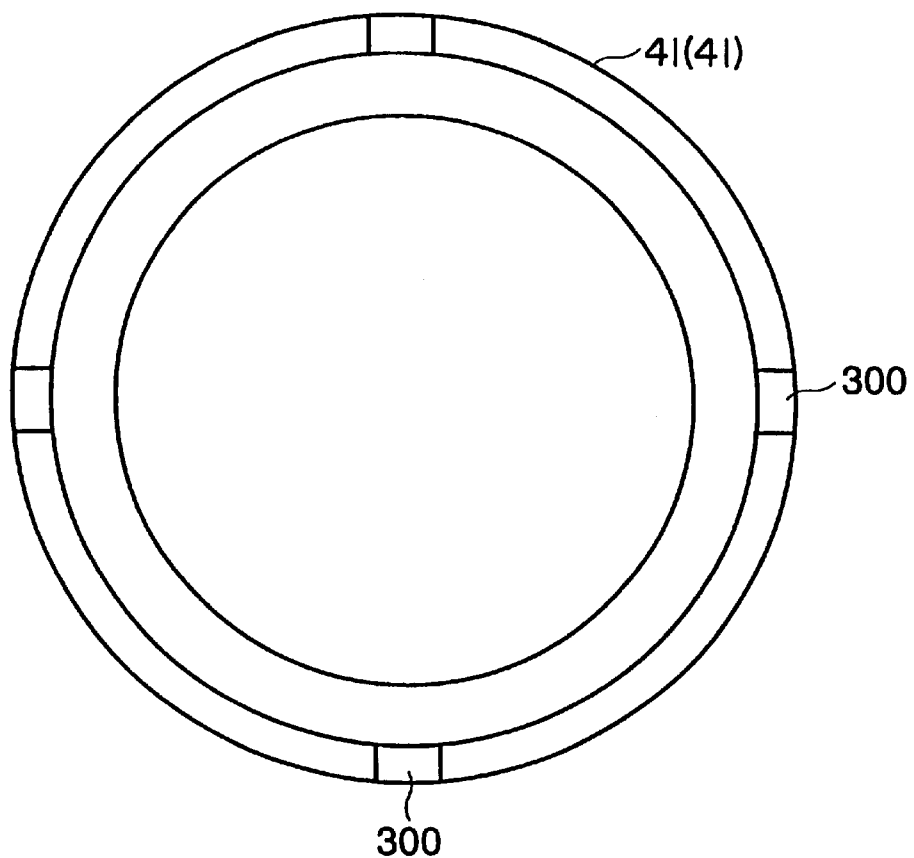
FIG. 15 is a front view showing an embodiment of an angular bearing outer ring constituting the single-cavity, toroidal type continuously variable transmission in accordance with the present invention.
Figure 16:
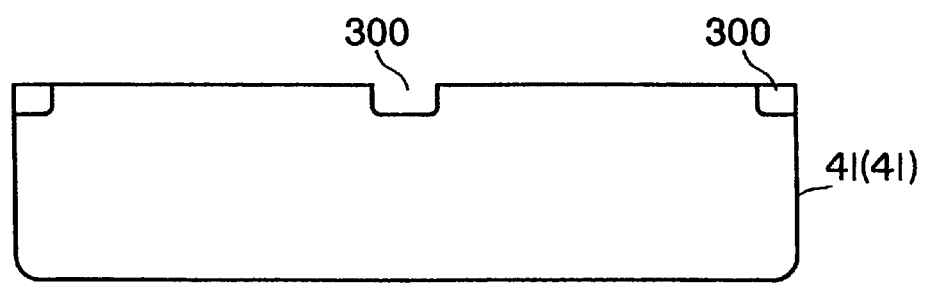
FIG. 16 is a cross-sectional view of the embodiment of the angular bearing outer ring shown in FIG. 15.

FIG. 15 is a front view of the angular bearing outer rings 41 and 41 joined to the pistons 55 and 54; and FIG. 16 is a cross-sectional view thereof. Formed on the rims of the outer rings 41 and 41 of the output angular bearing 40 and the input angular bearing 39, respectively, are four recessed sections 300 at the positions where they match the protuberances 200 of the pistons. The numbers of the protuberances 200 and the recessed sections 300 are not limited those mentioned in this embodiment; they may be, for example, three or six.

To join the pistons 55 and 54 to the angular bearing outer rings 41 and 41, the protuberances on the surfaces of the respective pistons are fitted in the recessed sections 300 formed on the rims of the outer rings 41 and 41 of the output angular bearing 40 and the input angular bearing 39, respectively, the shorter end surfaces of the protuberances 200 are butted against the bottom surfaces of the recessed sections 300. The side surfaces of the steps provided on the protuberances 200 are held against the outer peripheral surfaces of the recessed sections 300, thus serving as the guiding surfaces for the angular bearing outer rings 41 and 41. In this way, the pistons 55 and 54 are collar-joined to the outer rings 41 and 41 of the output angular bearing 40 and the input angular bearing 39 so as to form the pistons 55 and 54 and the outer rings 40 and 39 into one piece by spigot fitting; hence, the pistons 55 and 54 rotate smoothly and concentrically as the outer rings 41 and 41 of the output angular bearing 40 and the input angular bearing 39 rotate. Moreover, the hydraulic forces generated in the cylinders 50 and 52 are securely applied to the angular bearing outer rings 41 and 41 through the collar joint.

It is preferable to use a material having high hardness for the pistons 55 and 54, which integrally rotate with the angular bearings 41 and 41 through the collar joint, so that the pistons survive high rotation torque. The hardness of the material used for the support member 9 having the cylinders 50 and 52 which slide the rotating pistons 55 and 54 toward the torque input shaft 15 should be lower than that used for the pistons 55 and 54 in order to prevent scuffing, scratching, or other similar trouble that leads to damage to component surfaces. For instance, hardened iron may be used for the pistons 55 and 54, while cast iron, brass, aluminum or the like may be used for the support member 9. Further, the scuffing, scratching or other similar problem can be further effectively prevented by providing a thin layer of coating composed of "Teflon" (registered trademark) or other low-friction material on the joint surfaces on the outside diameter end and the joint surfaces on the inside diameter end of the pistons 55 and 54, and the cylinders 50 and 52 which are involved in sliding motion. The rotating portions of the angular bearings 41 and 41 are lubricated from other places than the collar joints; therefore, the bearings do not incur seizure.

In the case of the structure wherein the pistons 55 and 54 rotate in the cylinders 50 and 52, a labyrinth formed on the joint surface between the outer and inner wall surfaces of the cylinders 50 and 52 and the outer and inner peripheral surfaces of the pistons 55 and 54 secures oiltightness by preventing oil from leaking through a gap at the joint surface while ensuring smooth relative rotational motions of the cylinders and the pistons at the same time. In this embodiment, the outer peripheral surfaces and the inner peripheral surfaces of the pistons 55 and 54 have two-step structures, and the wall surfaces on the outside diameter end and the wall surfaces on the inner diameter end of the cylinders 50 and 52 are provided with similar stepped structures to match the stepped structures mentioned above; the labyrinth is formed by combining these stepped structures in such a manner that the outside diameters and the inside diameters thereof grow smaller from the cylinder bottom surfaces toward the piston surfaces.

To enable the pistons 55 and 54 to be easily fitted to the cylinders 50 and 52, respectively, annular support auxiliary members 9a and 9b are provided on both ends of the outermost peripheral portion of the support member 9 to separate the stepped section of the wall surface on the outside diameter end, and the two support auxiliary members 9a and 9b are joined to the support member 9 at the switching portion of the stepped section formed on the outer peripheral surfaces of the pistons 55 and 54. The support member 9 and the two support auxiliary members 9a and 9b are all secured to the casing 11 and they do not rotate. The gap between the outer peripheral surfaces of the support member 9 and the two support auxiliary members 9a and 9b and the inner surface of the casing 38 is sealed by an O-ring or the like to prevent oil from leaking along the mounting surfaces to the casing 38. If the labyrinth is not formed by the pistons 55 and 54 and the cylinders 50 and 52, then the support auxiliary members 9a and 9b are no longer necessary; hence, a continuous cylinder wall surface can be formed using the single support member 9.

Figure 17:
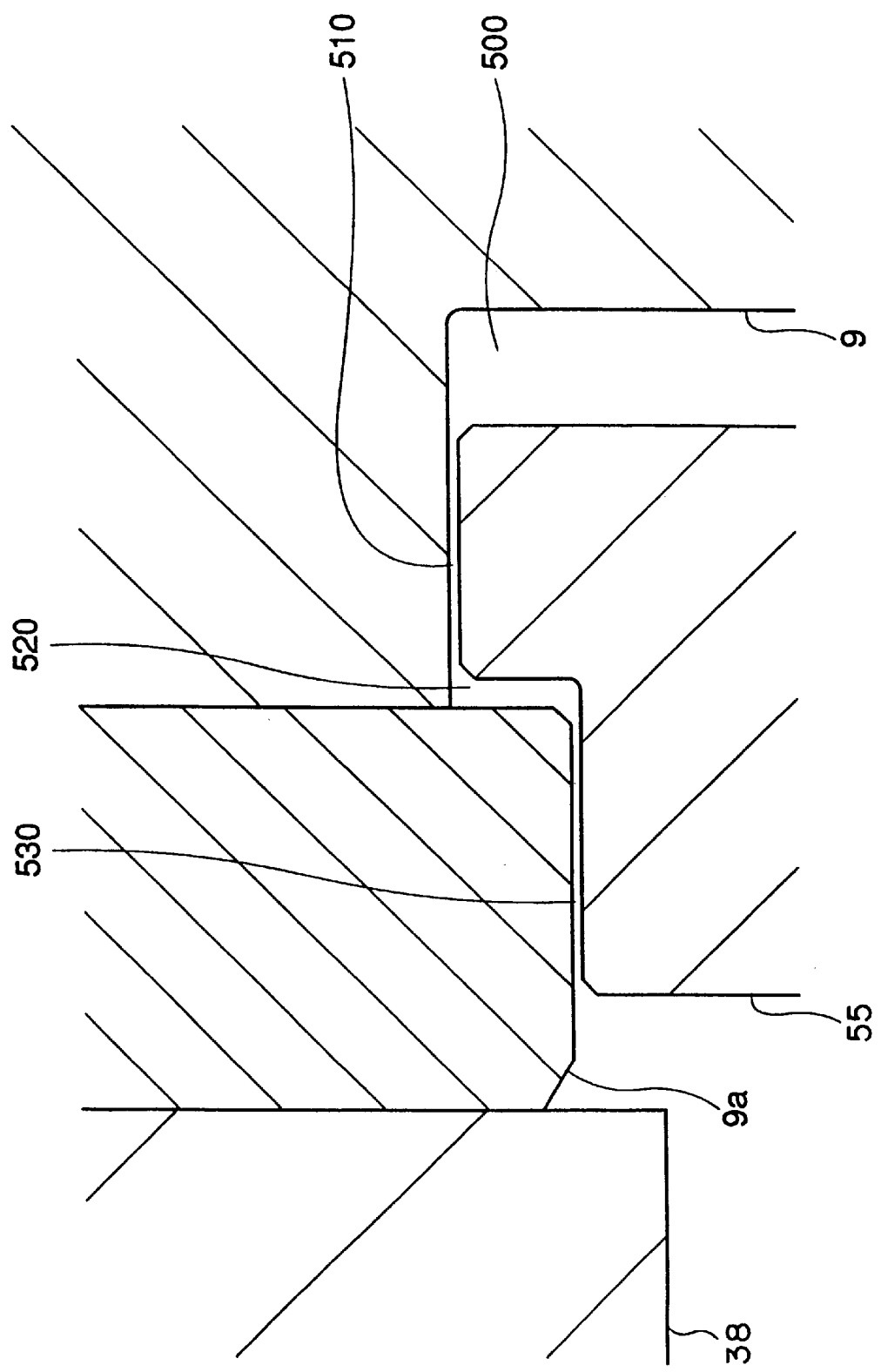
FIG. 17 is a view which has been enlarged toward outside diameter and which shows an example of the labyrinth formed by an output piston and a cylinder.
Figure 18:
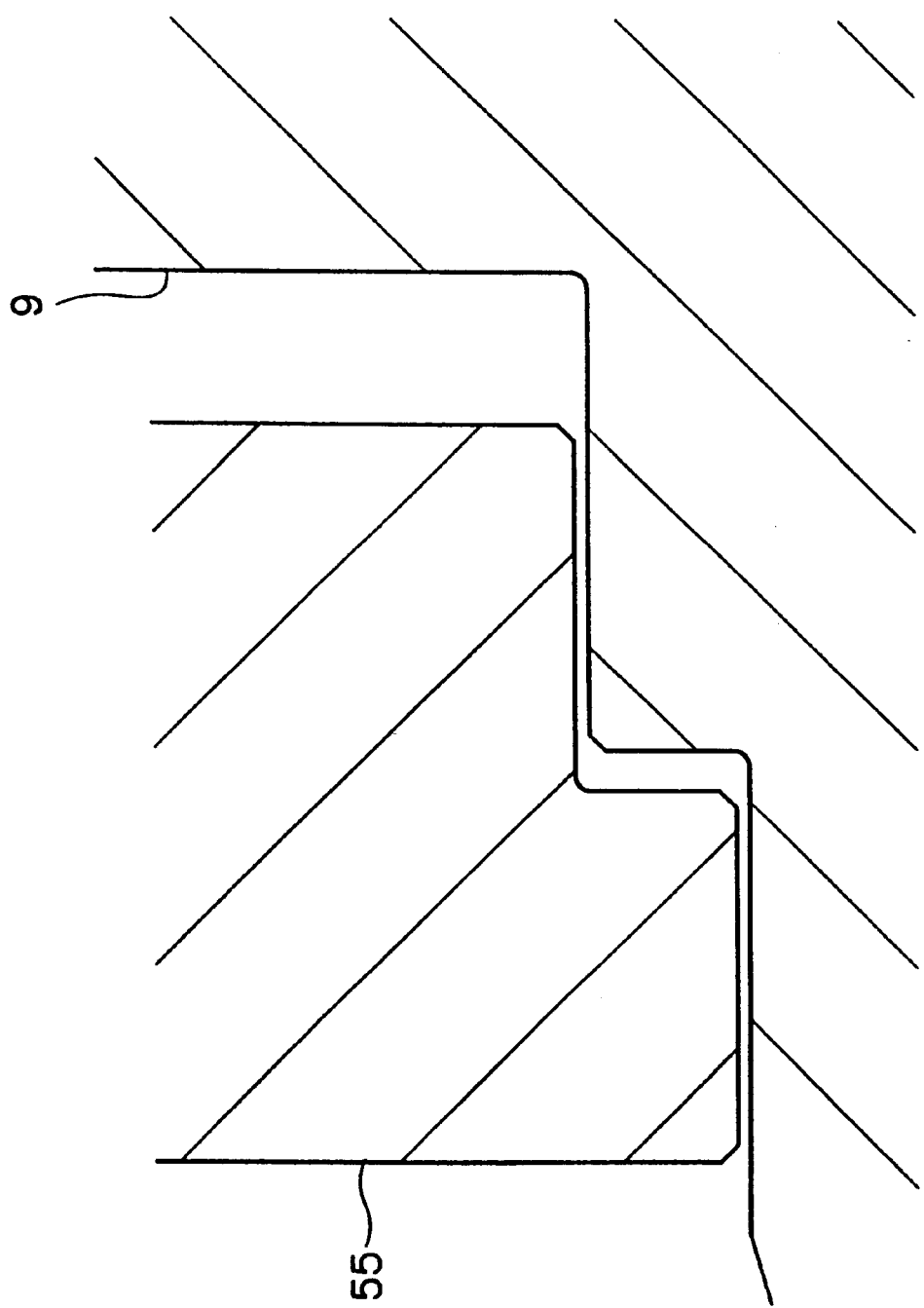
FIG. 18 is a view which has been enlarged toward inside diameter and which shows the example of the labyrinth shown in FIG. 17.

FIGS. 17 and 18 are enlarged views of the labyrinth formed by the output piston 55 and the cylinder 50; FIG. 17 is the view toward the outside diameter, while FIG. 18 is the view toward the inside diameter. The gap of the labyrinth grows narrower in the direction of the diameter of the torque input shaft 15, whereas it grows wider along the torque input shaft 15. The behavior of oil retained in the labyrinth between the rotating output piston 55 and the cylinder 50 will now be described in conjunction with FIG. 17.

In such a labyrinth, the majority of oil supplied into the cylinder 50 while the toroidal type continuously variable transmission is in operation stays in a first oil reservoir 500. A small amount of the oil in the first oil reservoir moves along the torque input shaft 15 through a first land gap 510 of the large diameter portion of the piston, but it leaks into a second oil reservoir 520 and stays therein. Only a very small amount of the oil in the second oil reservoir 520 passes through a second land gap 530, moves along the torque input shaft 15, and leaks out toward the piston surface, then it is released to the air.

Further in this embodiment, the outside diameter and the inside diameter of the stepped structure constituting the labyrinth are gradually decreased in the direction in which the oil leaks out as mentioned above. While the toroidal type continuously variable transmission is in operation, the oil in the cylinder 50 tends to move away from the torque input shaft 15 due to the centrifugal force generated by the rotation of the piston 55. The stepped structure makes it difficult for the oil from reaching the entrances of the first land gap 510 and the second land gap 530, thus permitting further effective prevention of the oil from being released to the air.

The labyrinth explained above minimizes the leakage of the oil stored in the cylinder 50, so that sufficiently high oil pressure is always secured in the cylinder 50, making it possible to control the power loss, which is produced at the drive pump (not shown) for supplying the oil, to an extremely small value. The same principle applies also to the labyrinth on the inside diameter end shown in FIG. 18, and satisfactory oiltightness at the joint surface between the output piston 55 and the cylinder 50 can be maintained. Furthermore, although it is not illustrated herein, the similar labyrinth can be formed also by the input piston 54 and the cylinder 52, and the equivalent effect for preventing the oil leakage can be achieved.

In particular, the aforesaid labyrinth used in combination with the collar joint connecting the pistons 55 and 54, and the bearing outer rings 41 and 41 enables a proper labyrinth gap to be always maintained between the pistons 55 and 54, and the cylinders 50 and 52, enabling the oil leakage through the joint to be controlled to a minimum.

The present invention provides the configurations and operations as explained above, so that it increases transmission efficiency and it is capable of, for example, improving the driving performance and the rate of fuel consumption of a motorcar incorporating a toroidal type continuously variable transmission. The present invention is also capable of extending the service life of ball-and-roller bearings with resultant higher durability.

Thus, the single-cavity, toroidal type continuously variable transmission in accordance with the present invention enables reduced thrust loads on the bearings which leads to lower transmission loss produced at the bearings, permitting higher transmission efficiency of the entire toroidal type continuously variable transmission. The reduced loads on the bearings allow reduced size and weight of the bearings and the components around the bearings. Further, the support member is securely positioned in relation to the casing and the output disc or the input disc is positioned in relation to the casing, and sufficient rigidity is secured at the time of rotation. This makes it possible to realize a single-cavity, toroidal type continuously variable transmission which features high stability with less deformation.

Moreover, in the single-cavity, toroidal type continuously variable transmission according to the present invention, the pistons and the bearing outer rings are integrally rotated by collar joint, and the labyrinth is formed on the joint surface between the pistons and the cylinders to minimize oil leakage; hence, the thrust loads on the bearings can be further reduced, resulting in further improved transmission efficiency.

In addition, in the single-cavity, toroidal type continuously variable transmission according to the present invention, the magnitude of the hydraulic force acting on the output bearing and the input bearing can be adjusted according to the reaction force applied to the output disc and the input disc. This makes it possible to reduce the thrust loads applied to the bearings under any loading conditions, permitting still higher power transmission efficiency of the entire toroidal type continuously variable transmission.

What is claimed is:

1. A toroidal continuously variable transmission comprising:

a transmission housing;

a torque input shaft;

an input disc and an output disc which are supported around said torque input shaft with inner surfaces thereof opposed to each other such that they are free to rotate with respect to said torque input shaft;

a pressuring device which is provided between an outer surface of said input disc and said torque input shaft and which rotates said input disc together with said torque input shaft while pressing said input disc toward said output disc;

a trunnion which rocks about a pivot disposed in a plane which intersects central axes of said input disc and said output disc;

a power roller held between the opposed inner surfaces of said input disc and said output disc while the power roller is rotatably joined to said trunnion;

a first ball-and-roller bearing which is provided between said torque input shaft and a first fixed portion of said transmission housing and which supports a first thrust load applied from said torque input shaft in a direction parallel to said torque input shaft as said pressing device is actuated; and a second ball-and-roller bearing which is provided between said output disc and a second fixed portion of said transmission housing, and which supports a second thrust load applied from said output disc in a direction opposite from said first thrust load as said pressuring device is actuated;

wherein a hydraulic force generator provided in a position adjacent to said first ball-and-roller bearing and said second ball-and-roller bearing reduces said first thrust load applied to said first ball-and-roller bearing and said second thrust load applied to said second ball-and-roller bearing by:

a hydraulic force in the opposite direction from the direction in which said first thrust load is applied to a first bearing race positioned on the input end of said first thrust load of said first ball-and-roller bearing; and a hydraulic force in the opposite direction from the direction in which said second thrust load is applied to a second bearing race positioned on the input end of said second thrust load of said second ball-and-roller bearing;

thereby reducing the rotational resistance of said first ball-and-roller bearing and the rotational resistance of said second ball-and-roller bearing;

said hydraulic force in the opposite direction of action of said first thrust load and said hydraulic force in the opposite direction from the action of said second thrust load are respectively generated by an oil supplied into a first cylinder bore and a second cylinder bore through a common oil passage port formed through a third fixed portion of said transmission housing and a cylinder block of said hydraulic force generator; said first and second ball-and-roller bearings are positioned on one side of said input disc.

2. A toroidal continuously variable transmission according to claim 1, wherein the hydraulic force in the opposite direction from the direction of action of said first thrust load and the hydraulic force in the opposite direction from the direction of action of said second thrust load are respectively smaller than said first thrust load and said second thrust load.

3. The toroidal continuously variable transmission according to claim 1 or 2, wherein a high-pressure oil employed in a hydraulic circuit for speed change control is introduced to said hydraulic force generator and the pressure of the oil introduced to said hydraulic force generator is a line pressure of said hydraulic circuit for speed change control.

4. The toroidal continuously variable transmission according to claim 1 or 2, wherein a high-pressure oil employed in a hydraulic circuit for speed change control is introduced to said hydraulic force generator and the pressure of the oil introduced to said hydraulic force generator is a line pressure of said hydraulic circuit for speed change control, which line pressure has been adjusted through a pressure regulator.

5. The toroidal continuously variable transmission according to claim 1 or 2, wherein a high-pressure oil employed in a hydraulic circuit for speed change control is introduced to said hydraulic force generator and the pressure of the oil introduced to said hydraulic force generator is a line pressure of said hydraulic circuit for speed change control, the oil having the pressure produced by a high-pressure cylinder subjected to a traction force.

6. The toroidal continuously variable transmission according to claim 1 or 2, wherein a high-pressure oil employed in a hydraulic circuit for speed change control is introduced to said hydraulic force generator and the pressure of the oil introduced to said hydraulic force generator is a line pressure of said hydraulic circuit for speed change control, the oil having a pressure produced by adjusting the pressure of the high-pressure cylinder subjected to a traction force by a pressure regulator.

7. The toroidal continuously variable transmission according to claim 1 or 2, wherein a high-pressure oil employed in a hydraulic circuit for speed change control is introduced to said hydraulic force generator and the pressure of the oil introduced to said hydraulic force generator is a pressure difference between a pressure of a high-pressure cylinder for speed change control which is subjected to a traction force, and a pressure of a low-pressure cylinder for speed change control.

8. The toroidal continuously variable transmission according to claim 1, wherein said hydraulic force generator comprises:

said cylinder block which has said first cylinder bore and said second cylinder bore formed along the torque input shaft so that they are opposed to each other, with a side surface thereof, closer to an outside diameter of said cylinder block, joined to said transmission housing; and a first piston and a second piston which are respectively fitted in said first cylinder bore and said second cylinder bore; wherein said first piston and said second piston apply the hydraulic force in the opposite direction from the direction of action of said first thrust load and the hydraulic force in the opposite direction from the direction of action of said second thrust load to said first bearing race and said second bearing race, respectively.

9. The toroidal continuously variable transmission according to claim 8, wherein an outside diameter of said first piston and an outside diameter of said second piston are larger than an outside diameter of said first ball-and-roller bearing and an outside diameter of said second ball-and-roller bearing, respectively.

10. The toroidal continuously variable transmission according to claim 8, wherein a sealing member for providing said oil passage port, said first cylinder bore, and said second cylinder bore with an oil tight barrier is attached to the surface where said cylinder block and said fixed portion are joined.

11. A toroidal continuously variable transmission according to claim 8, wherein:

said first bearing race integrally rotates with said torque input shaft; and said second bearing race integrally rotates with said output disc.

12. The toroidal continuously variable transmission according to claim 11, wherein said first bearing race and said second bearing race are an inner race of said first ball-and-roller bearing and an inner race of said second ball-and-roller bearing, respectively.

13. The toroidal continuously variable transmission according to claim 12, wherein thrust roller bearings are respectively provided between said inner race of said first ball-and-roller bearing and a piston surface of said first piston, and between said inner race of said second ball-and-roller bearing and a piston surface of said second piston.

14. The toroidal continuously variable transmission according to claim 12, wherein:

said inner race of said first ball-and-roller bearing and said first piston, and said inner race of said second ball-and-roller bearing and said second piston are respectively formed integrally; and said first piston and said second piston respectively rotate in said first cylinder bore and said second cylinder bore.

15. The toroidal continuously variable transmission according to claim 14, wherein seal rings mounted on an outer peripheral surface and an inner peripheral surface of said first piston, and an outer peripheral surface and an inner peripheral surface of said second piston are nearly frictionless and provide an oil tight barrier.

16. The toroidal continuously variable transmission according to claim 11, wherein said first bearing race and said second bearing race are an outer race of said first ball-and-roller bearing and an outer race of said second ball-and-roller bearing, respectively.

17. The toroidal continuously variable transmission according to claim 16, wherein said outer race of said second ball-and-roller bearing is secured by internally fitting it to a recession formed on an inside diameter portion of said output gear which is joined to said output disc so as to integrally rotate.

18. The toroidal continuously variable transmission according to claim 16, wherein said outer race of said first ball-and-roller bearing is fitted internally and secured by a holder which is integrally formed with an outer peripheral surface of said torque input shaft.

19. The toroidal continuously variable transmission according to claim 16, wherein said outer race of said first ball-and-roller bearing is secured by internally fitting it to a flange member which is jointed to an outer peripheral surface of said torque input shaft.

20. The toroidal continuously variable transmission according to claim 17, wherein the outer race of said first ball-and-roller bearing is fitted internally and secured by a holder which is integrally formed with an outer peripheral surface of said torque input shaft.

21. The toroidal continuously variable transmission according to claim 16, 17, 18, 19 or 20, wherein thrust roller bearings are respectively provided between said outer race of said first ball-and-roller bearing and a piston surface of said first piston, and between said outer race of said second ball-and-roller bearing and a piston surface of said second piston.

22. The toroidal continuously variable transmission according to claim 16, 17, 18, 19 or 20, wherein:
   said outer race of said first ball-and-roller bearing and said first piston, and said outer race of said second ball-and-roller bearing and said second piston are respectively formed integrally; and
   said first piston and said second piston respectively rotate in said first cylinder bore and said second cylinder bore.

23. The toroidal continuously variable transmission according to claim 22, wherein seal rings mounted on an outer peripheral surface and an inner peripheral surface of said first piston, and an outer peripheral surface and an inner peripheral surface of said second piston are nearly frictionless and provide an oil tight barrier.

24. The toroidal continuously variable transmission according to claim 16, wherein:
   a first protuberance and a second protuberance are respectively formed on a piston surface of said first piston and a piston surface of said second piston;
   an end surface of said first protuberance and an end surface of said second protuberance respectively provide guiding surfaces of said outer race of said first ball-and-roller bearing and said outer race of said second ball-and-roller bearing, respectively;
   said first protuberance provides a collar joint between said first piston and said outer race of said first ball-and-roller bearing so that they rotate integrally; and
   said second protuberance provides a collar joint between said second piston and said outer race of said second ball-and-roller bearing so that they rotate integrally.

25. The toroidal continuously variable transmission according to claim 24, wherein:
   an outer peripheral surface and an inner peripheral surface of said first piston, and the outer surface and the inner surface of said first cylinder bore in which said piston is fitted, and
   an outer peripheral surface and an inner peripheral surface of said second piston, and an outer surface and an inner surface of said second cylinder bore in which said piston is fitted
   respectively, form a stepped structure of at least two steps with a predetermined gap provided therebetween.

26. The toroidal continuously variable transmission according to claim 25, wherein said stepped structure formed by said first cylinder bore and said first piston, respectively, is shaped having a larger diameter adjacent to a bottom surface of said first cylinder bore, and a smaller diameter in the direction toward said first piston; and wherein said stepped structure formed by said second cylinder bore and said second piston, respectively, is shaped having a larger diameter adjacent to a bottom surface of said second cylinder bore, and a smaller diameter in the direction toward said second piston.

27. A toroidal continuously variable transmission according to claim 25, wherein the hardness of said first piston and said second piston is higher than the hardness of said first cylinder bore and said second cylinder bore.

28. The toroidal continuously variable transmission according to claim 25, wherein a low-friction material is coated on:
   said outer peripheral surface of said first piston and said outer peripheral surface of said second piston; and
   said inner peripheral surface of said first piston and said inner peripheral surface of said second piston.

29. The toroidal continuously variable transmission according to claim 25, wherein a low friction material is coated on;
   said outer surface of said first cylinder bore and said outer surface of said second cylinder bore in which said pistons are fitted; and
   said inner peripheral surface of said first piston and said inner peripheral surface of said second piston.

30. The toroidal continuously variable transmission according to claim 25, wherein a low friction material is coated on:
   said outer peripheral surface of said first piston and said outer peripheral surface of said second piston; and
   said inner surface of said first cylinder bore and said inner surface of said second cylinder bore in which said pistons are fitted.

31. The toroidal continuously variable transmission according to claim 25, wherein a low friction material is coated on:
   the outer surface of said first cylinder bore and the outer surface of said second cylinder bore in which said pistons are fitted; and
   the inner surface of said first cylinder bore and the inner surface of said second cylinder bore in which said pistons are fitted.

32. The toroidal continuously variable transmission according to claim 24, wherein seal rings mounted on an outer peripheral surface and an inner peripheral surface of said first piston, and an outer peripheral surface and an inner peripheral surface of said second piston are nearly frictionless and provide an oil tight barrier.

* * * * *